United States Patent
Kim

(10) Patent No.: US 9,804,758 B2
(45) Date of Patent: Oct. 31, 2017

(54) METHOD AND APPARATUS FOR PROVIDING INFORMATION ABOUT IMAGE PAINTING AND RECORDING MEDIUM THEREOF

(71) Applicant: SAMSUNG ELECTRONICS CO., LTD., Suwon-si (KR)

(72) Inventor: Jong-hyun Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 293 days.

(21) Appl. No.: 14/473,160

(22) Filed: Aug. 29, 2014

(65) Prior Publication Data
US 2015/0067526 A1   Mar. 5, 2015

(30) Foreign Application Priority Data
Aug. 30, 2013   (KR) .......................... 10-2013-0104517

(51) Int. Cl.
 G06F 15/16    (2006.01)
 G06F 3/0484   (2013.01)
 G06Q 10/10    (2012.01)

(52) U.S. Cl.
 CPC ...... *G06F 3/04845* (2013.01); *G06F 3/04842* (2013.01); *G06Q 10/101* (2013.01)

(58) Field of Classification Search
 CPC . G06F 3/04845; G06F 15/16; G06F 17/30165
 USPC ........................................ 715/739, 737, 738
 See application file for complete search history.

(56) References Cited

U.S. PATENT DOCUMENTS

| | | | |
|---|---|---|---|
| 5,627,950 A * | 5/1997 | Stokes ................. | H04N 1/6011 345/419 |
| 7,356,563 B1 | 4/2008 | Leichtling et al. | |
| 8,213,987 B2 * | 7/2012 | Takizuka .................. | G06F 3/14 382/173 |
| 8,595,810 B1 * | 11/2013 | Ben Ayed ........... | H04L 63/0815 713/168 |
| 8,625,796 B1 * | 1/2014 | Ben Ayed ........... | H04L 63/0853 380/258 |
| 8,648,827 B2 * | 2/2014 | Sip ...................... | G06F 3/04883 345/1.1 |
| RE45,559 E * | 6/2015 | Williams ............. | G06F 3/03545 |
| 9,100,772 B2 * | 8/2015 | Jantunen ............... | H04W 8/005 |

(Continued)

FOREIGN PATENT DOCUMENTS

KR   10-2006-0108131 A   10/2006

OTHER PUBLICATIONS

International Search Report for PCT/KR2014/008151 dated Dec. 19, 2014 [PCT/ISA/210].

(Continued)

*Primary Examiner* — Daeho Song
(74) *Attorney, Agent, or Firm* — Sughrue Mion, PLLC

(57) ABSTRACT

A method of providing image painting information is provided. The method includes: displaying a paintable first image on a screen of a terminal; receiving a user input requesting reference painting information about the first image; requesting painting information of a second image related to the first image from a server, based on the user input; receiving the painting information of the second image from the server; and displaying the received painting information of the second image on the screen of the terminal.

17 Claims, 22 Drawing Sheets

(56) References Cited

U.S. PATENT DOCUMENTS

| | | | |
|---|---|---|---|
| 9,235,373 B2* | 1/2016 | Toren | G06F 3/1423 |
| 2004/0175047 A1* | 9/2004 | Gormish | H04N 7/17318 |
| | | | 382/232 |
| 2005/0004749 A1* | 1/2005 | Park | G01C 21/3647 |
| | | | 701/412 |
| 2006/0015562 A1* | 1/2006 | Kilian-Kehr | H04L 67/04 |
| | | | 709/206 |
| 2007/0136422 A1* | 6/2007 | Ohtani | H04L 65/403 |
| | | | 709/204 |
| 2008/0076471 A1* | 3/2008 | Yuki | H04N 7/142 |
| | | | 455/556.1 |
| 2008/0183811 A1* | 7/2008 | Kotras | G06F 17/30873 |
| | | | 709/203 |
| 2009/0044128 A1 | 2/2009 | Baumgarten et al. | |
| 2009/0077168 A1* | 3/2009 | Sadasue | G06F 17/3028 |
| | | | 709/203 |
| 2009/0192919 A1 | 7/2009 | Hess et al. | |
| 2009/0207177 A1 | 8/2009 | Ryu | |
| 2009/0320015 A1 | 12/2009 | Ha et al. | |
| 2010/0033500 A1 | 2/2010 | Kim | |
| 2010/0083109 A1* | 4/2010 | Tse | A63F 13/10 |
| | | | 715/702 |
| 2010/0234001 A1* | 9/2010 | Miyata | H04M 1/7253 |
| | | | 455/414.1 |
| 2011/0018963 A1* | 1/2011 | Robinson | G06Q 10/00 |
| | | | 348/14.16 |
| 2011/0078590 A1* | 3/2011 | Hao | G06Q 10/06 |
| | | | 715/755 |
| 2011/0159896 A1* | 6/2011 | Nonaka | G09G 5/346 |
| | | | 455/466 |
| 2011/0243397 A1 | 10/2011 | Watkins et al. | |
| 2012/0062688 A1* | 3/2012 | Shen | G06F 3/04886 |
| | | | 348/14.03 |
| 2012/0110576 A1* | 5/2012 | Lin | G06F 9/50 |
| | | | 718/1 |
| 2012/0206319 A1* | 8/2012 | Lucero | H04N 21/4788 |
| | | | 345/1.3 |
| 2013/0073420 A1 | 3/2013 | Kumm et al. | |
| 2013/0091205 A1 | 4/2013 | Kotler et al. | |
| 2013/0097518 A1* | 4/2013 | Pearcy | G06F 9/542 |
| | | | 715/741 |
| 2013/0141517 A1* | 6/2013 | Shen | H04N 7/15 |
| | | | 348/14.03 |
| 2013/0156275 A1 | 6/2013 | Amacker et al. | |
| 2013/0198292 A1* | 8/2013 | Aaltonen | H04W 56/00 |
| | | | 709/205 |
| 2013/0217504 A1* | 8/2013 | Saito | A63F 13/795 |
| | | | 463/42 |
| 2013/0218845 A1* | 8/2013 | Kleppner | G06F 17/30165 |
| | | | 707/687 |
| 2013/0288603 A1* | 10/2013 | Iwasaki | H04W 4/008 |
| | | | 455/41.2 |
| 2014/0002327 A1* | 1/2014 | Toren | G06F 3/1423 |
| | | | 345/1.1 |
| 2014/0033265 A1* | 1/2014 | Leeds | G06F 21/10 |
| | | | 726/1 |
| 2014/0149499 A1* | 5/2014 | Pointon | H04L 67/04 |
| | | | 709/204 |
| 2014/0232616 A1* | 8/2014 | Drake | H04B 5/02 |
| | | | 345/1.2 |
| 2015/0089452 A1* | 3/2015 | Dorninger | G06Q 10/101 |
| | | | 715/848 |

OTHER PUBLICATIONS

Written Opinion for PCT/KR2014/008151 dated Dec. 19, 2014 [PCT/ISA/237].

TechnoBuffalo, "TechnoBuffalo—What's the Apps: Zigzag Board Review", Jan. 15, 2011, Retrieved from the Internet: URL: https://www.youtube.com/watch?v=v5XTfOIGIRY [Retrieved on Oct. 6, 2014], XP054975538, (1 page total).

Communication issued Mar. 14, 2017 by the European Patent Office in counterpart European Patent Application No. 14839599.9.

\* cited by examiner

METHOD AND APPARATUS FOR PROVIDING INFORMATION ABOUT IMAGE PAINTING AND RECORDING MEDIUM THEREOF

RELATED APPLICATION

This application claims priority from Korean Patent Application No. 10-2013-0104517, filed on Aug. 30, 2013, in the Korean Intellectual Property Office, the disclosure of which is incorporated herein in its entirety by reference.

1. FIELD

One or more exemplary embodiments of relate to methods in which terminals provide image painting information, methods for servers to provide image painting information, terminals for providing image painting information, servers for providing image painting information, and recording media thereof.

2. DESCRIPTION OF THE RELATED ART

Terminals may be configured to perform various functions. In addition, as the development of smartphones has accelerated, various applications have been developed and used.

In particular, as data has been shared between terminals, various applications which perform collaborative operations have been developed. Accordingly, collaborative operations, which were able to be performed only off-line, can now be performed on-line.

However, in the case of performing a collaborative operation on-line, since information about an operation state is not shared in real time between terminals, the collaborative operation is not smoothly performed in practice.

Therefore, there is a need for a system that allows information about a collaborative operation to be shared in real time between terminals.

SUMMARY

One or more exemplary embodiments include image painting information providing methods and systems for providing reference painting information about an image displayed on a screen, and recording media thereof.

Additional aspects will be set forth in part in the description which follows and, in part, will be apparent from the description, or may be learned by practice of the exemplary embodiments.

According to one or more exemplary embodiments, a method for a terminal to provide image painting information includes: displaying a paintable first image on a screen of the terminal; receiving a user input requesting reference painting information about the first image; requesting painting information of a second image related to the first image from a server, based on the user input; receiving the painting information of the second image from the server; and displaying the received painting information of the second image on the screen of the terminal.

The displaying of the received painting information of the second image may include displaying the second image painted in at least one color on a predetermined region of the screen of the terminal.

The requesting of the painting information of the second image may include: extracting an object included in the first image; and transmitting identification information of the extracted object to the server.

The receiving of the painting information of the second image may include receiving painting information of the second image including the object.

The receiving of the painting information of the second image may further include receiving painting information of the object included in the second image from the server.

The displaying of the received painting information of the second image may include displaying the painting information of the object included in the second image on the object included in the first image for a predetermined period of time.

The first image and the second image may be different sub-images into which an image is divided.

The requesting of the painting information of the second image may include: receiving a user input for selecting a partial region of the first image; and when the partial region is included in a first boundary region of the first image, which is located within a predetermined distance from a division line between the first image and the second image, requesting painting information of a second boundary region of the second image, which is located within a predetermined distance from the division line, from the server.

The displaying of the received painting information of the second image may include displaying the painting information of the second boundary region of the second image, which is received from the server.

The painting information of the second image may include at least one of color information, texture information, and thickness information of the second image.

According to one or more exemplary embodiments, a method for a server to provide image painting information comprises: receiving a reference painting information request, comprising identification information of a first image displayed on a first terminal, from the first terminal; extracting a second image related to the first image, based on the identification information of the first image; and transmitting painting information of the extracted second image as reference painting information about the first image to the first terminal.

The transmitting of the painting information of the extracted second image may comprise: requesting the painting information of the second image from a second terminal displaying the second image; receiving the painting information of the second image from the second terminal; and transmitting the received painting information of the second image to the first terminal.

The method may further comprise: receiving identification information of an object included in the first image; extracting a third image including the object, based on the identification information of the object; and transmitting painting information of the object included in the extracted third image to the first terminal.

The transmitting of the painting information of the extracted second image may include transmitting a painted second image to the first terminal.

The method may further comprise: dividing an image into a plurality of sub-images; and transmitting a first sub-image of the divided image to the first terminal and transmitting a second sub-image of the divided image to the second terminal.

The receiving of the reference painting information request may comprise receiving a request for painting information of a second boundary region of the second image, which is located within a predetermined distance from a division line between the first image and the second image.

The transmitting of the painting information of the extracted second image may comprise transmitting the painting information of the second boundary region of the second image to the first terminal.

The painting information of the second image may comprise at least one of color information, texture information, and thickness information of the second image.

According to one or more exemplary embodiments, a method for a first terminal to provide image painting information comprises: displaying a paintable first image on a screen of the first terminal; receiving a user input requesting reference painting information about the first image; selecting a second image related to the first image among a plurality of images received from an external device; and displaying painting information of the second image.

The method may further comprise broadcasting identification information of the first image and painting information of the first image.

The displaying of the painting information of the second image may comprise displaying the second image painted in at least one color on a predetermined region of the screen.

The selecting of the second image related to the first image may comprise extracting painting information of an object included in the second image, based on identification information of the object included in the first image, and the displaying of the painting information of the second image may comprise displaying the painting information of the object included in the second image on the object included in the first image for a predetermined period of time.

The first image and the second image may be different sub-images into which an image is divided.

The receiving of the user input may comprise receiving a selection of a first boundary region of the first image, which is located within a predetermined distance from a division line between the first image and the second image, and the displaying of the painting information of the second image may comprise displaying painting information of a second boundary region of the second image, which is located within a predetermined distance from the division line.

The painting information of the second image may comprise at least one of color information, texture information, and thickness information of the second image.

According to one or more exemplary embodiments, a terminal for providing image painting information comprises: a display configured to display a paintable first image; a communication device configured to request painting information of a second image related to the first image from a server and receive the painting information of the second image from the server; and a controller configured to control the display such that the display displays the received painting information of the second image.

According to one or more exemplary embodiments, a server which provides image painting information comprises: a receiver configured to receive a reference painting information request, including identification information of a first image displayed on a first terminal, from the first terminal; a controller configured to extract a second image related to the first image, based on the identification information of the first image; and a transmitter configured to transmit painting information of the extracted second image as reference painting information about the first image to the first terminal.

According to one or more exemplary embodiments, a terminal for providing image painting information includes: a display configured to display a paintable first image; a user input device configured to receive a user input requesting reference painting information about the first image; a communication device configured to receive identification information of a plurality of images and painting information of the plurality of images; and a controller configured to select a second image related to the first image among the plurality of images and control the display such that the display displays painting information of the second image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
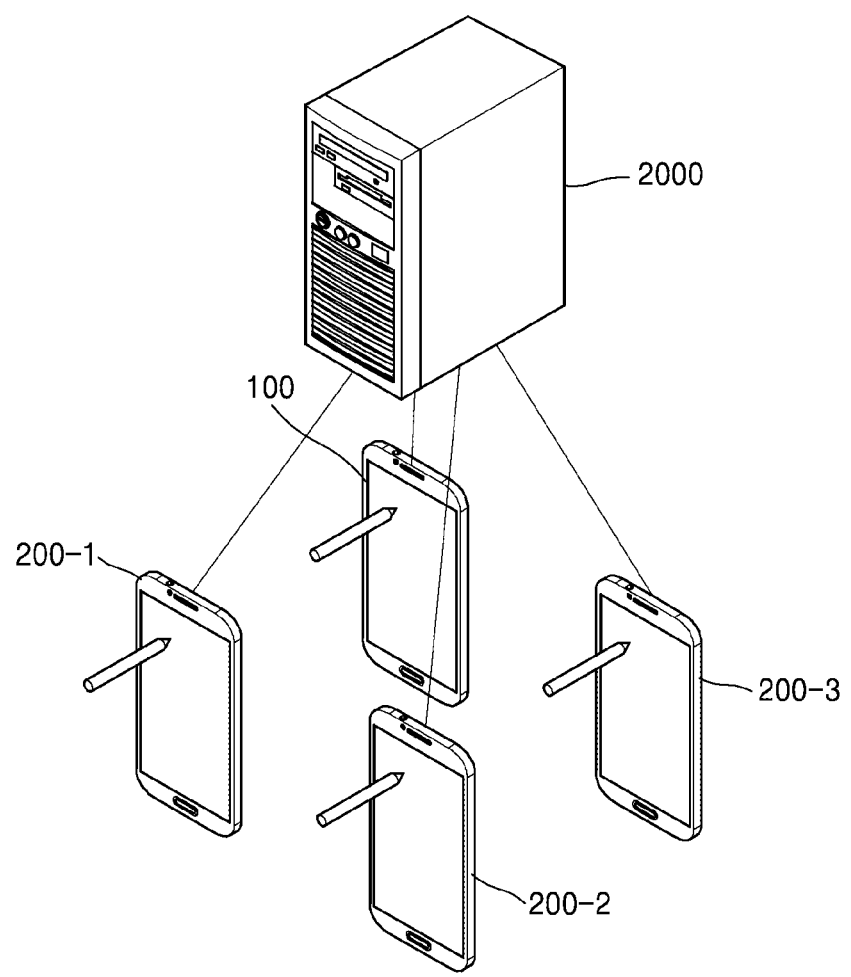
FIG. 1 is a schematic diagram illustrating a system for providing image painting information, according to an exemplary embodiment.

Reference will now be made in detail to the exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Exemplary embodiments will be described below in detail with reference to the accompanying drawings so that those of ordinary skill in the art may easily implement the exemplary embodiments. In this regard, the present exemplary embodiments may have different forms and should not be construed as being limited to the descriptions set forth herein. In addition, portions irrelevant to the description of the exemplary embodiments will be omitted in the drawings for a clear description of the exemplary embodiments, and like reference numerals will denote like elements throughout the specification.

It will be understood that when an element is referred to as being "connected" to another element, it may be directly connected to the other element or may be electrically connected to the other element with other element(s) interposed therebetween. It will also be understood that the terms "comprises", "includes", and "has", when used herein, specify the presence of stated elements, but do not preclude the presence or addition of other elements, unless otherwise defined.

Hereinafter, exemplary embodiments will be described in detail with reference to the accompanying drawings.

FIG. 1 is a schematic diagram illustrating a system for providing image painting information, according to an exemplary embodiment.

Referring to FIG. 1, the system for providing image painting information may include a plurality of terminals 100, 200-1, 200-2, and 200-3 and a server 2000.

In FIG. 1, only elements related to the present exemplary embodiment are illustrated. Therefore, those of ordinary skill in the art will understand that the system may further include other general-purpose components in addition to the components illustrated in FIG. 1.

According to an exemplary embodiment, the terminals 100, 200-1, 200-2, and 200-3 may be terminals that provide images that may be painted by users. For example, each of the terminals 100, 200-1, 200-2, and 200-3 may display a paintable image on a screen and receive painting information about a displayed image from the user. Also, each of the terminals 100, 200-1, 200-2, and 200-3 may apply the painting information to the displayed image. Also, each of the terminals 100, 200-1, 200-2, and 200-3 may transmit the received painting information to the server 2000.

For example, when the user paints a displayed flower image in a red color by using a touch tool (e.g., a finger or an electronic pen), each of the terminals 100, 200-1, 200-2, and 200-3 may apply a red color to the flower image and display the red flower image on the screen.

Also, each of the terminals 100, 200-1, 200-2, and 200-3 may provide reference painting information about the paintable image to the user. The reference painting information may be painting information of an image related to the displayed image (e.g., an image including the same object as the displayed image or an image connectable with the displayed image).

For convenience of description, among the terminals 100, 200-1, 200-2, and 200-3, the terminal 100 requesting reference painting information from the server 2000 will be referred to as a first terminal 100, and at least one of the other terminals 200-1, 200-2, and 200-3 will be referred to as a second terminal 200. Also, for convenience of description, an image displayed on the first terminal 100 will be referred to as a first image, and an image displayed on the second terminal 200 will be referred to as a second image.

The first terminal 100 may communicate with the server 2000. For example, the first terminal 100 may receive the first image from the server 2000. Also, the first terminal 100 may receive reference painting information about the first image from the server 2000.

According to an exemplary embodiment, the first terminal 100 may periodically receive the reference painting information about the first image from the server 2000. According to another exemplary embodiment, when an input signal requesting the reference painting information is received from the user, the first terminal 100 may request and receive the reference painting information from the server 2000. For example, when the user requests the reference painting information about the first image, the first terminal 100 may transmit a signal requesting the reference painting information about the first image to the server 2000 and receive the reference painting information about the first image from the server 2000.

Also, the first terminal 100 may transmit painting information about the first image to the server 2000. According to an exemplary embodiment, the first terminal 100 may periodically transmit the painting information about the first image to the server 2000. According to another exemplary embodiment, the first terminal 100 may transmit the painting information about the first image to the server 2000 whenever there is a change in the painting information about the first image.

The first terminal 100 may be embodied in various forms. For example, the first terminal 100 described herein may be a mobile phone, a smartphone, a laptop computer, or a tablet personal computer (PC), but is not limited thereto.

The second terminal 200 may communicate with the server 2000. According to an exemplary embodiment, the second terminal 200 may receive a second image from the server 2000. Also, the second terminal 200 may transmit painting information about the second image displayed on the screen to the server 2000. According to another exemplary embodiment, whenever the second terminal 200 receives painting information from the user, the second terminal 200 may transmit the received painting information to the server 2000. According to another exemplary embodiment, the second terminal 200 may transmit painting information of the second image to the server 2000 when there is a request from the server 2000.

Also, the second terminal 200 may receive reference painting information about the second image from the server 2000.

According to an exemplary embodiment, the second terminal 200 may periodically receive the reference painting information about the second image from the server 2000. According to another exemplary embodiment, when an input signal requesting the reference painting information is received from the user, the second terminal 200 may request and receive the reference painting information from the server 2000.

The second terminal 200 may be embodied in various forms. For example, the second terminal 200 described herein may be a mobile phone, a smartphone, a laptop computer, or a tablet PC, but is not limited thereto.

According to the exemplary embodiments, a plurality of paintable images may be images that are related to each other. For example, the images related to each other may be a plurality of images having temporal relations therebetween (e.g., cartoon images), or a plurality of sub-images into which an image is divided, but are not limited thereto.

According to an exemplary embodiment, the server 2000 may be a server that provides a collaborative painting service to a plurality of terminals. The server 2000 according to an exemplary embodiment may divide an image into a plurality of sub-images and distribute each of the sub-images to a plurality of terminals, respectively. The server 2000 may transmit the sub-images to the terminals, respectively. Also, the server 2000 may provide a collaborative painting service to users by receiving painting information about the sub-images from the respective terminals.

For example, the server 2000 may provide a collaborative painting service about four cartoon images. The server 2000 may provide a first cartoon image to the first terminal 100, provide a second cartoon image to the terminal 200-1, provide a third cartoon image to the terminal 200-2, and provide a fourth cartoon image to the terminal 200-3. Also, the server 2000 may receive painting information about the first cartoon image from the first terminal 100, receive painting information about the second cartoon image from the terminal 200-1, receive painting information about the third cartoon image from the terminal 200-2, and receive painting information about the fourth cartoon image from the terminal 200-3.

Also, the server 2000 may manage painting information received from each of the terminals. For example, the server 2000 may construct a painting information database for each of the terminals. Painting information of each image displayed on each of the terminals may be stored in the painting information database. The painting information stored in the painting information database may be updated whenever the painting information of the image displayed on a terminal changes.

Also, information about the relation between images may be stored in the painting information database. For example, among four cartoon images distributed to four terminals, a main character may be included in common in the first cartoon image and the third cartoon image. The server 2000 may store information about the relation between the first cartoon image and the third cartoon image, in which the main character is included in common, among the four cartoon images in the painting information database.

The server 2000 may transmit the reference painting information to each of the terminals based on the painting information stored in the painting information database. When the server 2000 receive a reference painting information request from the first terminal 100, the server 2000 may extract painting information of images, which are related to the first image distributed to the first terminal 100, from the painting information database and transmit the extracted painting information to the first terminal 100.

According to another exemplary embodiment, even when a reference painting request is not received from the terminals, the server 2000 may periodically provide the reference painting information to each of the terminals.

Hereinafter, a method in which the server 2000 divides an image into a plurality of sub-images and a method in which the server 2000 distributes the sub-images to the terminals, respectively, will be described in detail with reference to FIG. 2.

Figure 2:
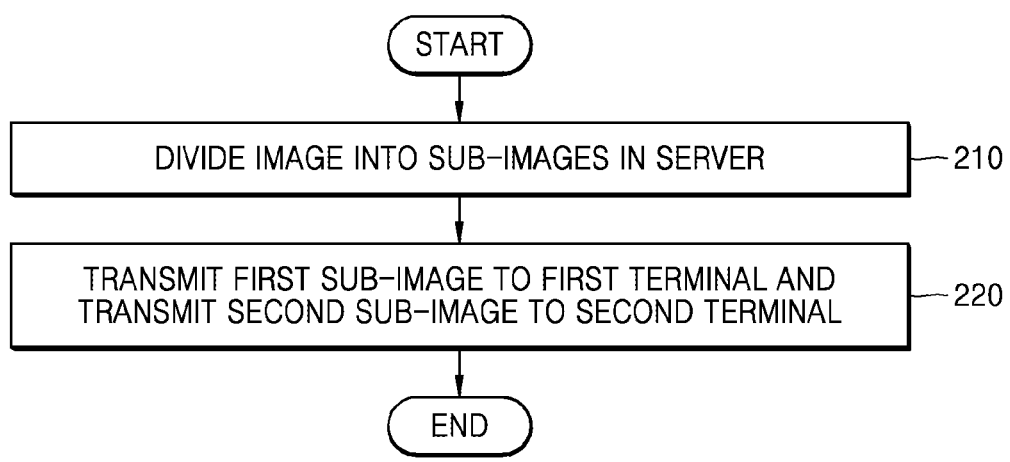
FIG. 2 is a flowchart illustrating a method in which a server distributes a plurality of sub-images, into which an image is divided, to a plurality of terminals, respectively, according to an exemplary embodiment.

FIG. 2 is a flowchart of a method in which the server 2000 distributes a plurality of sub-images, into which an image is divided, to a plurality of terminals, respectively, according to an exemplary embodiment.

Referring to FIG. 2, in operation 210, the server 2000 may divide an image into a plurality of sub-images.

According to an exemplary embodiment, the image may be selected by the user. For example, when a collaborative painting service provided by the server 2000 is used in an educational system of a school, a teacher, as the user, may select an image to be used in the curriculum according to the objective of the curriculum.

The image may include one or more objects. Also, the image may be a group of sub-images. For example, the image may include a plurality of cartoon image cuts.

Figure 4:
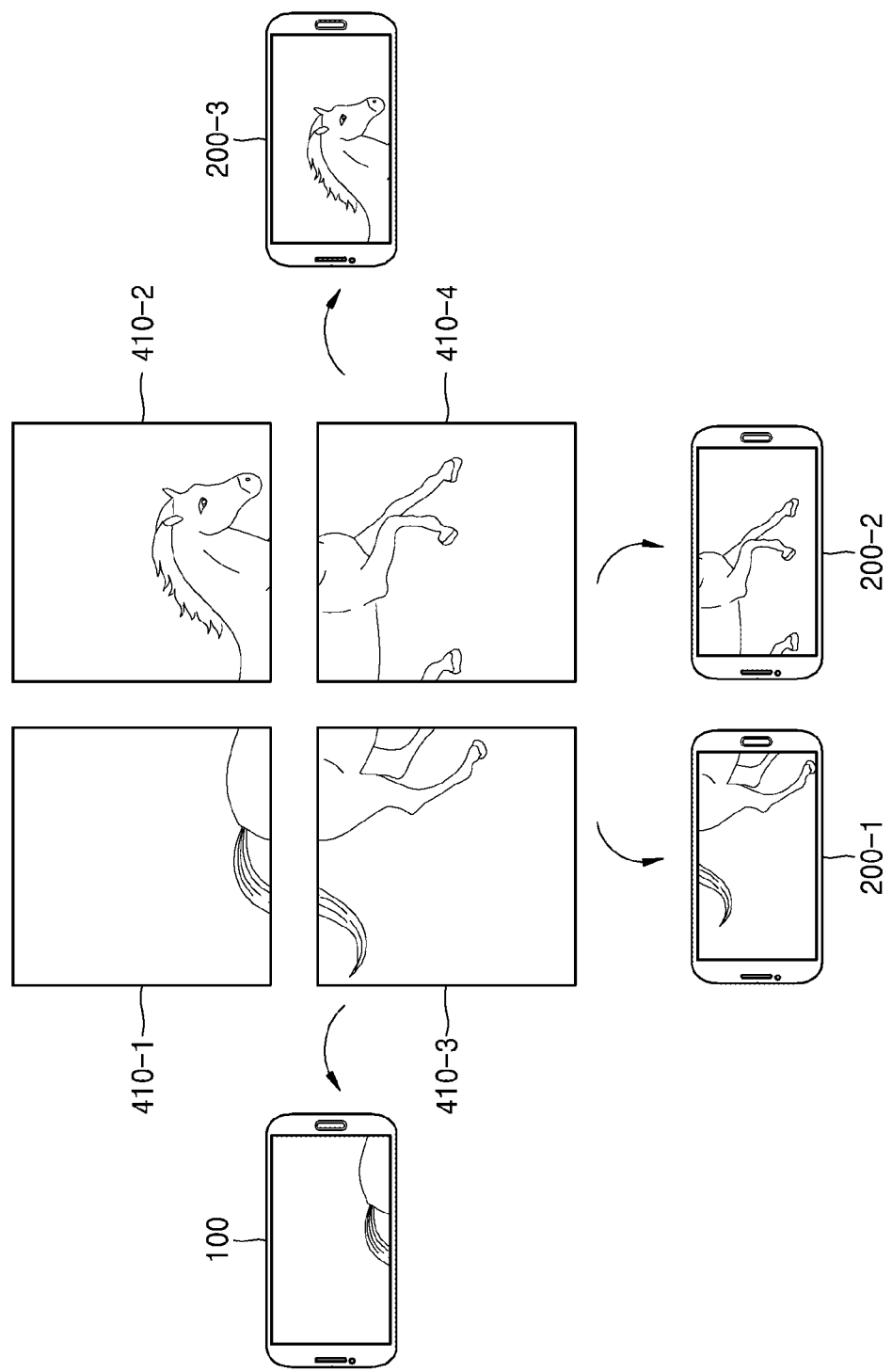
FIG. 4 is a diagram illustrating a method in which a server divides an image into sub-images, according to an exemplary embodiment.

According to an exemplary embodiment, the server 2000 may divide the image into a plurality of sub-images based on the number of terminals participating in collaborative painting. For example, when four terminals 100, 200-1, 200-2, and 200-3 participate in collaborative painting of an image, the server 2000 may divide the image into four sub-images, namely, the images 410-1, 410-2, 410-3, and 410-4 as illustrated in FIG. 4.

In operation 220, the server 2000 may transmit the sub-images to the respective terminals. For example, the server 2000 may transmit a first image among the sub-images to the first terminal 100 and transmit a second image among the sub-images to the second terminal 200.

According to another exemplary embodiment, the server 2000 may manage information about the terminals that have received the sub-images, respectively. For example, the server 2000 may manage mapping information that is obtained by mapping the sub-images, respectively, to the information about the terminals that have received the sub-images.

The mapping information may be stored in the form of a table in a mapping information database of the server 2000.

Also, a mapping information table may include mapping information about the first image that is received from the first terminal 100. Based on the information stored in the mapping information table, the server 2000 may map the first terminal 100, the first image received by the first terminal 100, and the mapping information of the first image.

Also, the mapping information table may include mapping information about the second image that is received from the second terminal 200. Based on the information stored in the mapping information table, the server 2000 may map the second terminal 200, the second image received by the second terminal 200, and the mapping information of the second image.

Figure 3:
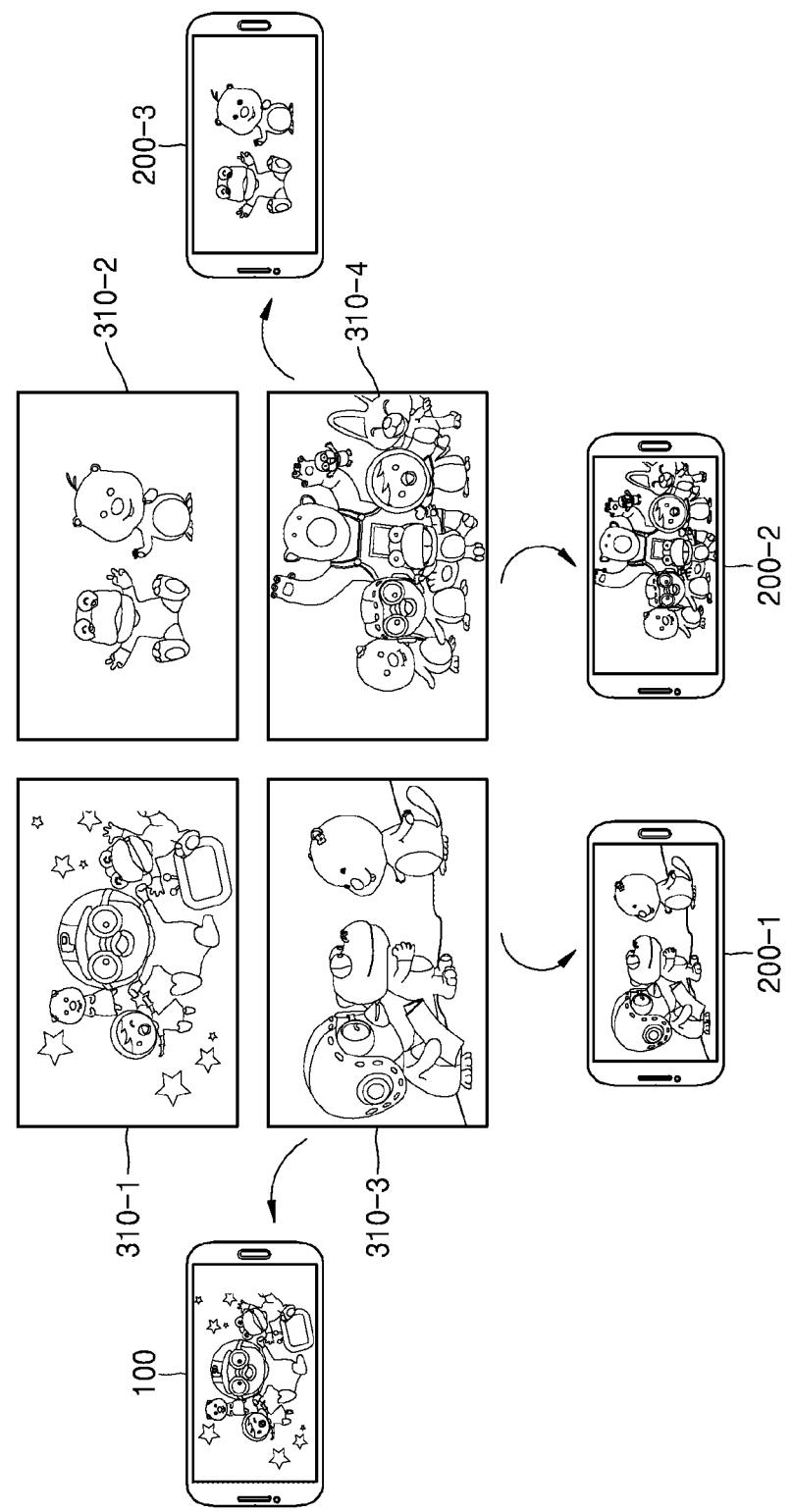
FIG. 3 is a diagram illustrating an example in which a plurality of sub-images, into which an image is divided, are distributed to a plurality of terminals, respectively, according to an exemplary embodiment.

FIG. 3 is a diagram illustrating an example in which a plurality of sub-images, into which an image is divided, are distributed to a plurality of terminals, respectively, according to an exemplary embodiment.

Referring to FIG. 3, the server 2000 may transmit four cartoon images 310-1, 310-2, 310-3, and 310-4 to the respective terminals 100, 200-1, 200-2, and 200-3. The four cartoon images 310-1, 310-2, 310-3, and 310-4 may have temporal relations therebetween. Also, the four cartoon images 310-1, 310-2, 310-3, and 310-4 may include an object in common.

The server 2000 may randomly select the images to be transmitted to the respective terminals 100, 200-1, 200-2, and 200-3. According to another exemplary embodiment, the server 2000 may transmit the images based on information of the terminals that has been previously acquired from an external device.

For example, when the users have been predesignated to paint the respective images, the server 2000 may designate the terminals, to which their respective images will be transmitted, based on the information of the terminals that has been previously acquired. For example, when a collaborative painting service according to an exemplary embodiment is used in an illustrating operation, a cartoon image to be painted by each person in charge of a respective terminal may be predesignated. In this case, the server 2000 may detect information of terminals participating in the illustrating operation and distribute images to the terminals, respectively.

FIG. 4 is a diagram illustrating a method in which the server 2000 divides an image into sub-images, according to an exemplary embodiment.

FIG. 4 illustrates a case where four terminals 100, 200-1, 200-2, and 200-3 participate in collaborative painting of an image. According to an exemplary embodiment, the server 2000 may divide an image into a plurality of sub-images based on the number of terminals participating in collaborative painting. For example, the server 2000 may divide the image into four sub-images 410-1, 410-2, 410-3, and 410-4.

While FIG. 4 illustrates that the image is divided into sub-images of the same size, an image dividing method is not limited thereto. For example, the image may be divided into sub-images of different sizes and may be divided into sub-images of different forms (shapes). The four sub-images 410-1, 410-2, 410-3, and 410-4 may be transmitted to the four terminals 100, 200-1, 200-2, and 200-3, respectively.

Figure 5:
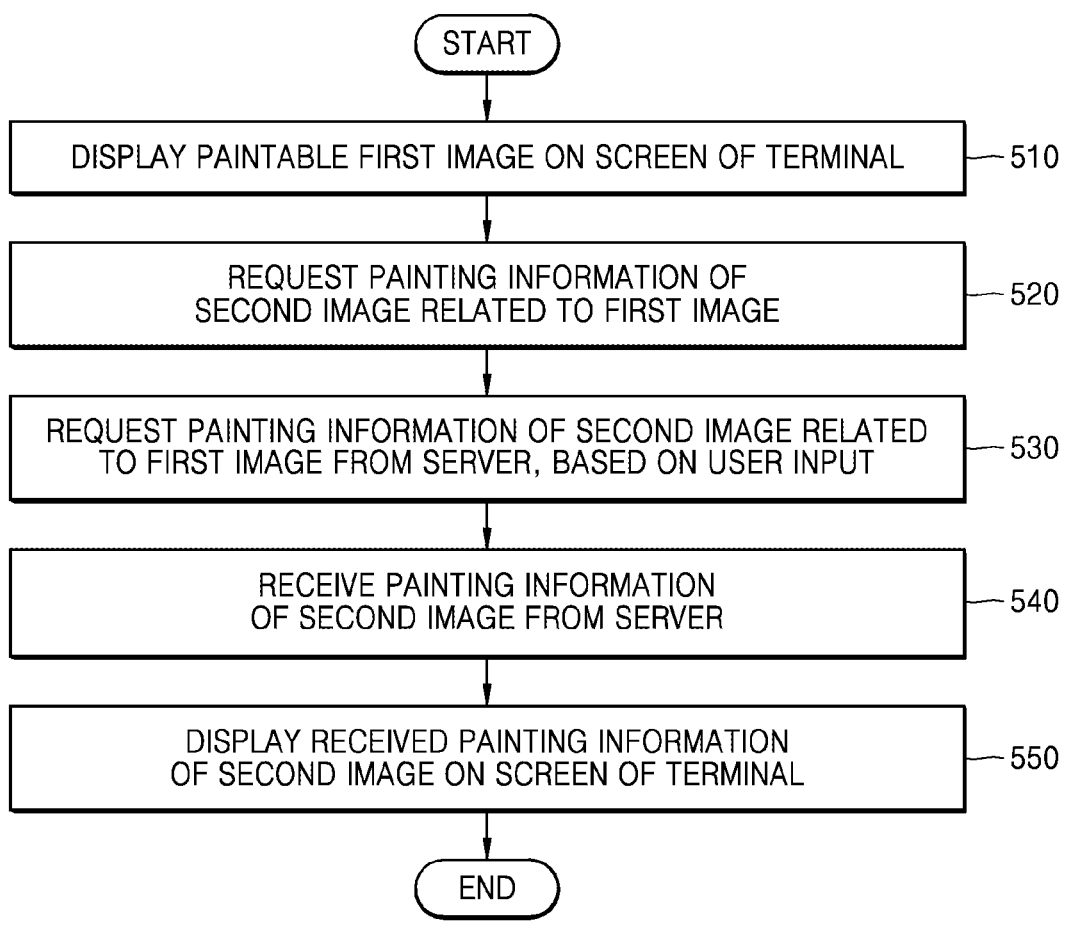
FIG. 5 is a flowchart illustrating a method in which a terminal provides image painting information, according to an exemplary embodiment.

FIG. 5 is a flowchart of a method in which the first terminal 100 provides image painting information, according to an exemplary embodiment.

Referring to FIG. 5, in operation 510, the first terminal 100 may display a paintable first image on a screen of the first terminal 100.

The first image may be an image distributed to the first terminal 100. The first terminal 100 may paint the first image based on a user input.

In operation 520, the first terminal 100 may receive a user input requesting reference painting information about the first image. The reference painting information may be painting information of an image related to the displayed image (e.g., an image including the same object as the displayed image or an image connectable with the displayed image).

The user may request the reference painting information from the first terminal 100 by using an input device such as a mouse or a keyboard, or by touching the screen. However, the exemplary embodiments are not limited thereto.

In operation 530, based on the user input requesting the reference painting information about the first image, the first terminal 100 may request painting information of a second image related to the first image from the server 2000.

According to an exemplary embodiment, the first terminal 100 may transmit identification information of the first image to the server 2000 together with the request for painting information of the second image. The server 2000 may detect the second image related to the first image, based on the identification information of the first image.

According to another exemplary embodiment, the first terminal 100 may transmit identification information of an object included in the first image to the server 2000, together with the request for painting information of the second image. The object may be selected based on a user input received by the first terminal 100. For example, when the user touches an object "A" included in the first image displayed on the first terminal 100, the first terminal 100 may transmit identification information of the object A to the server 2000 based on the selected object.

In operation 540, the first terminal 100 may receive painting information of the second image from the server 2000.

The painting information of the second image may be information about colors in which the second image is painted by the user of the second terminal. For example, the painting information of the second image may include color information, brightness information, chroma information, transparency information, gradation value information, and texture information of an object included in the second image.

According to an exemplary embodiment, the painting information of the second image may be painting information of an image including an object that is identical to the object included in the first image. For example, when the second image includes an object identical to the object "A" included in the first image, the first terminal 100 may receive painting information of a painted second image.

According to an exemplary embodiment, the first terminal 100 may receive the painted second image as the painting information of the second image from the server 2000. According to another exemplary embodiment, instead of receiving the painted second image, the first terminal 100 may receive painting information of the object "A" of the second image as the painting information of the second image. This will be described later in detail with reference to FIGS. 11 to 13.

According to another exemplary embodiment, the first terminal 100 may receive painting information of a boundary region of the second image as the painting information of the second image. Herein, the boundary region of the second image may be a region adjacent to the first image. For example, when an image is divided into sub-images, the boundary region may be regions that contact each other on a division line. This will be described later in detail with reference to FIG. 14.

In operation 550, the first terminal 100 may display the painting information of the second image received from the server 2000, on the screen of the first terminal 100.

According to an exemplary embodiment, the first terminal 100 may display the received painting information of the second image in a predetermined region of the screen of the first terminal 100. For example, the painting information of the second image may be displayed on an edge region of the screen of the first terminal 100. Also, the painting information of the second image may be displayed to overlap the first image displayed on the screen of the first terminal 100. However, the location of the painting information of the second image on the edge region of the screen of the first terminal is only exemplary.

When the user touches the region on which the painting information of the second image is displayed, the first terminal 100 may display the painting information of the second image fully on the screen of the first terminal 100.

Also, when the user again touches the screen on which the painting information of the second image is fully displayed, the painting information of the second image may be removed from the screen and only the first image may be displayed on the screen.

According to another exemplary embodiment, the painting information of the second image may be displayed on the screen of the first terminal 100 for a predetermined period of time. For example, when the user sets a painting information display time to five seconds, the painting information of the second image may be displayed on the screen of the first terminal 100 for five seconds.

According to another exemplary embodiment, the painting information of the second image may be displayed on the screen of the first terminal 100 while the user is performing a touch input to the first image displayed on the screen of the first terminal 100. For example, when the user performs a touch input to a portion of the first image, in which an apple object is displayed, the painting information of the second image related to the apple object may be displayed on the apple object while the touch input is being performed.

Also, the painting information of the second image may be displayed on a region that is located within a predetermined distance from a point touched by the user. For example, when the user performs a touch input to a portion of the first image, in which a horse object is displayed, the painting information of the second image related to the horse object may be displayed on a region that is within a radius of about 50 millimeters from a point touched by the user.

Figure 6:
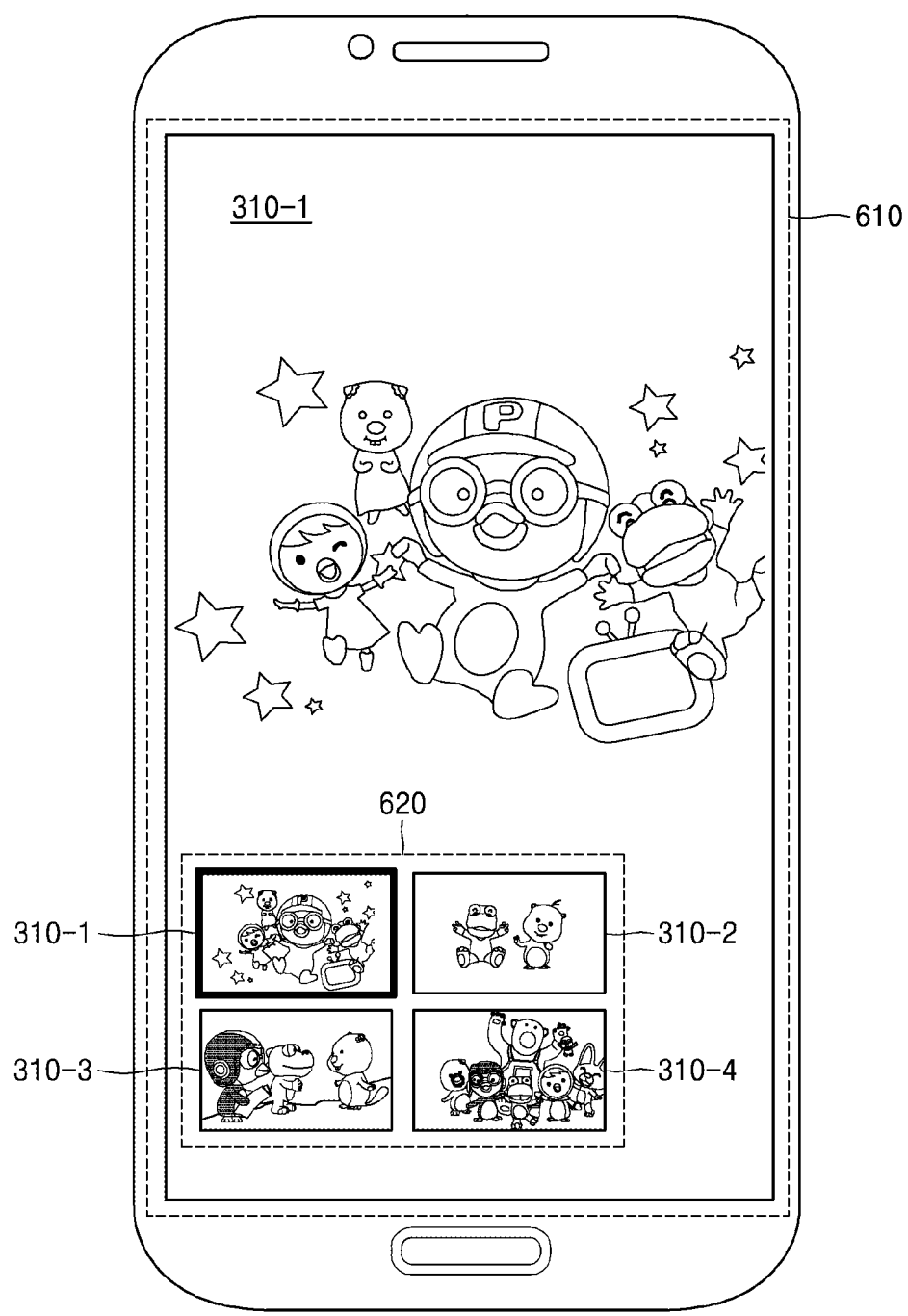
FIGS. 6 to 8 are diagrams illustrating methods of displaying painting information of a second image on a screen of a terminal, according to exemplary embodiments.

FIG. 6 is a diagram illustrating a method of displaying painting information of a second image on a screen of the first terminal 100, according to an exemplary embodiment.

Referring to FIG. 6, the first terminal 100 may display a first image 310-1 in a first region 610 of the screen of the first terminal 100. Also, the first terminal 100 may display painting information of second images 310-2, 310-3, and 310-4 related to the first image 310-1 as reference painting information about the first image 310-1 in a second region 620. According to an exemplary embodiment, the first terminal 100 may display painted second images 310-2, 310-3, and 310-4 as the reference painting information about the first image 310-1 in a predetermined region (i.e., the second region 620) of the screen of the first terminal 100.

The user may determine painting information of objects included in the first image 310-1, based on the displayed second images 310-2, 310-3, and 310-4. For example, an object P (e.g., a Pororo character) included in the first image 310-1 may be included in common in the third image 310-3 and the fourth image 310-4. When the object P is displayed on any one of the third image 310-3 and the fourth image 310-4, the user may determine painting information of the object P included in the first image 310-1, based on the displayed image. In detail, when a color of the object P included in the third image 310-3 is blue, the user may select a blue color as a painting color of the object P included in the first image 310-1.

According to an exemplary embodiment, the first terminal 100 may display a scaled-down image of the first image 310-1, which is obtained by scaling down the first image 310-1, and displaying the scaled-down image in the second region 620 together with the painting information of the second images 310-2, 310-3, and 310-4. In this case, the first terminal 100 may display an identification mark for discriminating the scaled-down image of the first image 310-1 from the second images 310-2, 310-3, and 310-4.

For example, the first terminal 100 may place a thick outline around the scaled-down image of the first image 310-1 to provide the user with information indicating that the first image 310-1 painted in the first terminal 100 is a top left image among the images displayed in the second region 620.

According to the exemplary embodiments, the first region 610 and the second region 620 may partially overlap each other or may not overlap each other.

While FIG. 6 illustrates an exemplary embodiment in which the first region 610 and the second region 620 overlap each other, the first region 610 and the second region 620 may not overlap each other.

Also, the position of the second region 620 may change according to a user input. For example, when the user touches and drags the painting information of the second images 310-2, 310-3, and 310-4 displayed on the second region 620, to a top right portion of the screen, the first terminal 100 may display the painting information of the second images 310-2, 310-3, and 310-4 which are originally displayed on a bottom left portion of the screen, on the top right portion of the screen.

When the user touches the second region 620, the first terminal 100 may display the painting information of the second images 310-2, 310-3, and 310-4 displayed on the second region 620, fully on the screen. Also, when the user again touches the screen on which the painting information of the second images 310-2, 310-3, and 310-4 is fully displayed, the first terminal 100 may remove the painting information of the second images 310-2, 310-3, and 310-4 from the screen and display only the first image 310-1 on the screen.

According to another exemplary embodiment, the user may select one of the second images 310-2, 310-3, and 310-4 displayed on the second region 620. For example, when the user touches the image 310-3, the first terminal 100 may display the image 310-3 fully on the screen of the first terminal 100. When the user again touches the screen, the first terminal 100 may remove the image 310-3 that is displayed fully on the screen.

Figure 7:
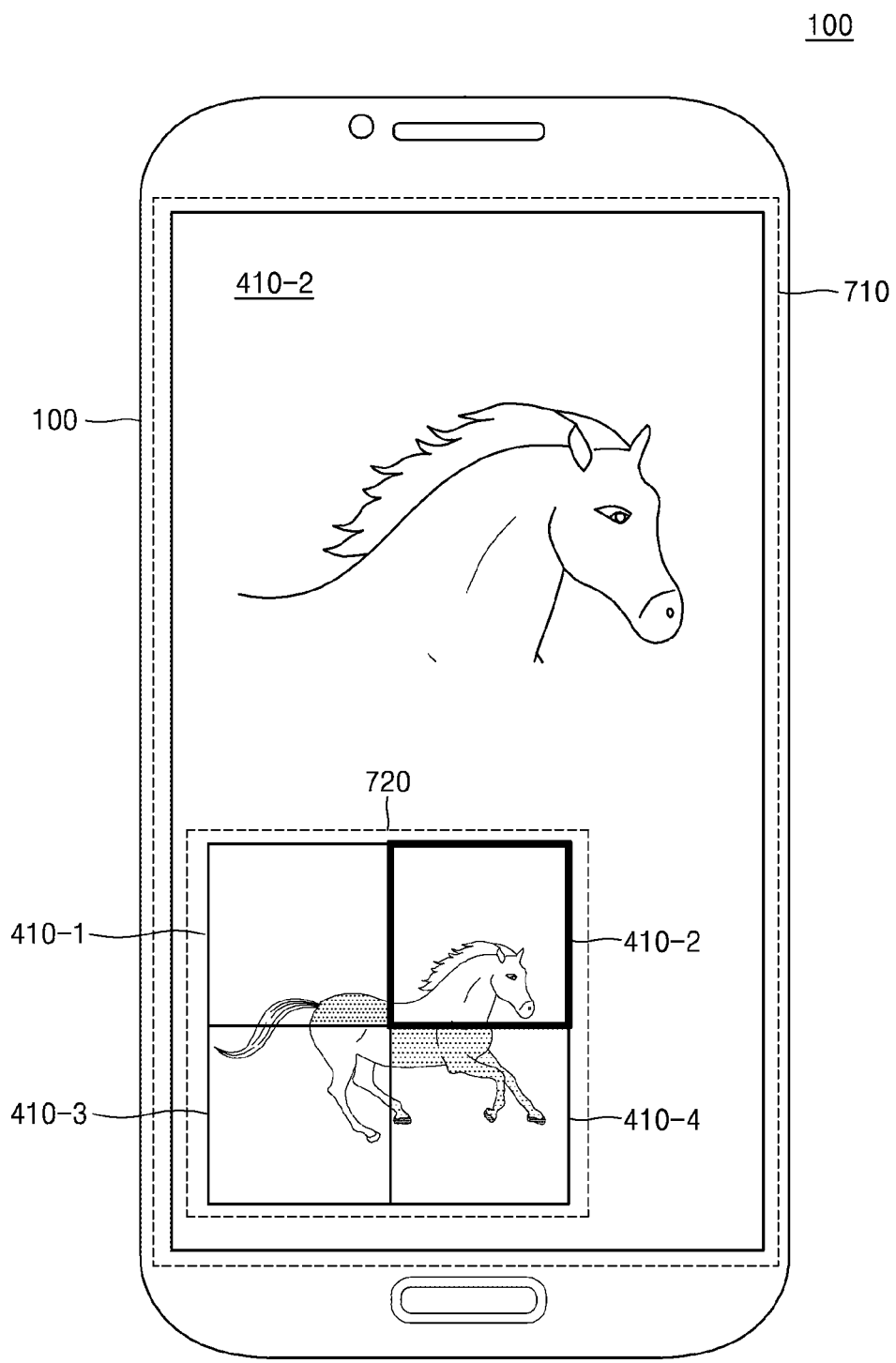

FIG. 7 is a diagram illustrating a method of displaying painting information of second images on the screen of the first terminal 100, according to an exemplary embodiment.

Referring to FIG. 7, the first terminal 100 may display a first image 410-2 on a first region 710 of the screen of the first terminal 100. Also, the first terminal 100 may display painting information of second images 410-1, 410-3, and 410-4 related to the first image 410-2 as reference painting information about the first image 410-2 on a second region 720. According to an exemplary embodiment, the first terminal 100 may display painted second images 410-1, 410-3, and 410-4 as reference painting information of the second images 410-1, 410-3, and 410-4 on a predetermined region (i.e., the second region 720) of the screen of the first terminal 100.

The user may determine painting information of the first image 410-2 based on the displayed second images 410-1, 410-3, and 410-4. According to an exemplary embodiment, the first image 410-2 and the second images 410-1, 410-3, and 410-4 may be sub-images into which an image is divided.

For example, an image including a horse object may be divided into four sub-images 410-1, 410-2, 410-3, and 410-4, namely, the second images 410-1, 410-3, and 410-4 and the first image 410-2. For example, the first image 410-2 may be the sub-image that includes a horse head object included in the image.

When the sub-images, into which the image is divided, are painted respectively in a plurality of terminals, there may be no painting information consistency between the sub-images. For example, even in the case of painting a horse object, the first image 410-2 may be painted in a yellow color, and the second images 410-1, 410-3, and 410-4 may be painted in a brown color. According to an exemplary embodiment, since painting information is shared between the sub-images, consistency may be provided in a collaborative painting operation.

All of the sub-images, namely, the second images 410-1, 410-3, and 410-4 and the first image 410-2, respectively include portions of the horse object. The user may detect the painting information of the second images 410-1, 410-3, and 410-4 before painting the horse head object. For example, when the user is painting a portion of the horse object included in the image 410-1 in a brown color, the user may paint the horse head object included in the first image 410-2 in a brown color with reference to the image 410-1.

According to an exemplary embodiment, the first terminal 100 may display a scaled-down image of the first image 410-2, which is obtained by scaling down the first image 410-2, on the second region 720 together with the painting information of the second images 410-1, 410-3, and 410-4. In this case, the first terminal 100 may display an identification mark for discriminating the scaled-down image of the first image 410-2 from the second images 410-1, 410-3, and 410-4.

For example, the first terminal 100 may mark a thick outline around the scaled-down image of the first image 410-2 to provide the user with information indicating that the first image 410-2 painted in the first terminal 100 is a top right image among the images displayed on the second region 720.

According to exemplary embodiments, the first region 710 and the second region 720 may partially overlap each other or may not overlap each other.

Figure 8:
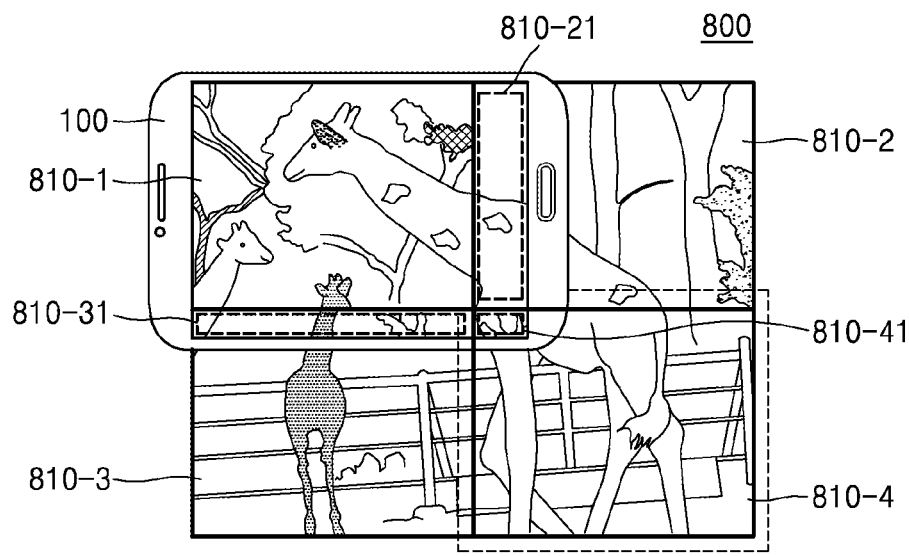

FIG. 8 is a diagram illustrating a method of displaying painting information of a second image on the screen of the first terminal 100, according to an exemplary embodiment.

Referring to FIG. 8, the first terminal 100 may receive painting information of second images 810-2, 810-3, and 810-4 related to a first image 810-1 from the server 2000. According to an exemplary embodiment, the first terminal 100 may periodically receive the painting information of the second images 810-2, 810-3, and 810-4. According to another exemplary embodiment, the first terminal 100 may receive the painting information of the second images 810-2, 810-3, and 810-4 according to a reference painting information request from the user.

According to an exemplary embodiment, the first image 810-1 and the second images 810-2, 810-3, and 810-4 may be sub-images into which an image is divided.

Together with the first image 810-1, boundary regions, namely, first, second, and third regions 810-21, 810-31, and 810-41, respectively included in the second images 810-2, 810-3, and 810-4 adjacent to the first image 810-1 may be displayed on the screen of the first terminal 100. The first, second, and third regions boundary regions 810-21, 810-31, and 810-41 may be regions that are located within a predetermined distance from division lines between the first image 810-1 and the second images 810-2, 810-3, and 810-4.

For example, the first boundary region 810-21 included in the image 810-2 may be a region that is located within a distance of about 1 centimeter from the division line between the first image 810-1 and the image 810-2. The second boundary region 810-31 included in the image 810-3 may be a region that is located within a distance of about 1 centimeter from the division line between the first image 810-1 and the image 810-3. The third boundary region 810-41 included in the image 810-4 may be a region that is located within a distance of about 1 centimeter from the division line between the first image 810-1 and the image 810-4.

According to an exemplary embodiment, painting information of the second boundary region 810-31 included in the image 810-3 may be reference painting information of the first image 810-1. For example, when an image including a giraffe object is divided by division lines, the giraffe object may be divided into giraffe sub-images. For example, the first image 810-1 may include a giraffe head object, and the image 810-3 may include a giraffe body object. The user may paint the first image 810-1 based on the painting information of the image 810-3.

The first terminal 100 may display the first, second, and third regions boundary regions 810-21, 810-31, and 810-41 respectively included in the second images 810-2, 810-3, and 810-4 related to the first image 810-1 on the screen. For example, the first boundary region 810-21 included in the image 810-2, the second boundary region 810-31 included in the image 810-3, and the third boundary region 810-41 included in the image 810-4 may be displayed on the screen of the first terminal 100.

When only the first image 810-1 is displayed on the first terminal 100, objects divided by division lines may be inconsistently painted. For example, in the case of the giraffe object divided by the division line between the first image 810-1 and the image 810-3, the head object and the body object may be painted in different colors. According to an exemplary embodiment, the first terminal 100 may display the painting information of the second boundary region 810-31 on the screen to provide reference painting information about the first image 810-1 to the user. Accordingly, the giraffe sub-images may be painted in the same color.

Figure 9:
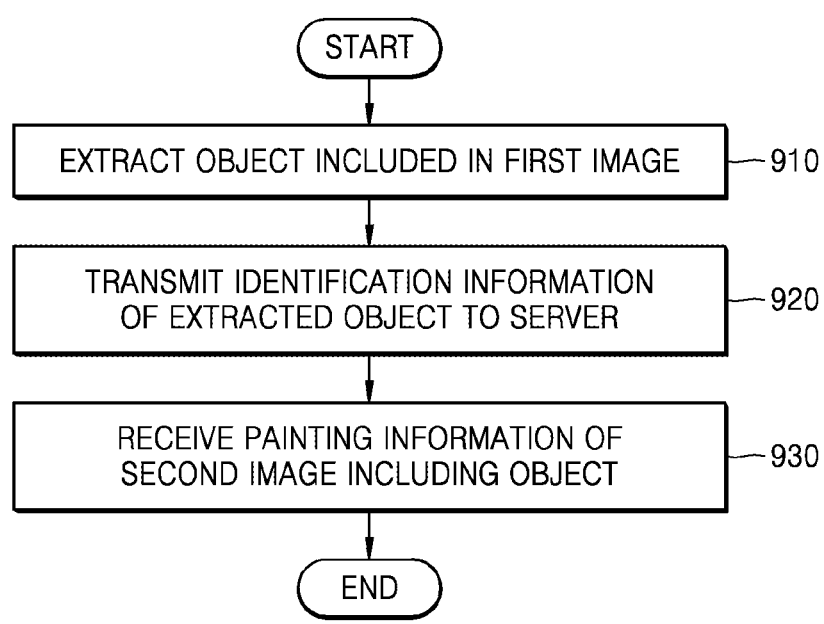
FIG. 9 is a flowchart illustrating a method in which a terminal provides painting information of an object included in a first image, according to an exemplary embodiment.

FIG. 9 is a flowchart of a method in which the first terminal 100 provides painting information of an object included in a first image, according to an exemplary embodiment.

In operation 910, the first terminal 100 may extract an object included in the first image. According to an exemplary embodiment, the first terminal 100 may extract the object from the first image based on a user input. For example, the user may touch and select a flower image included in the first image. The first terminal 100 may extract a region in which the flower image is displayed around a point at which a user touch input is received.

According to another exemplary embodiment, identification information of the region in which the flower image is displayed may be extracted. Objects included in the first image may include identification information that is preset to each of the objects. The identification information may be set by the server 2000. For example, the server 2000 may extract objects having a predetermined value or more of a similarity between related images and set the same identification information to the extracted objects. For example, when the similarity between a flower object included in the first image and a flower object included in the second image has a predetermined value or more, the same identification information may be set to the flower object included in the first image and the flower object included in the second image.

In operation 920, the first terminal 100 may transmit identification information of the extracted object to the server 2000. According to an exemplary embodiment, the first terminal 100 may transmit a request for reference painting information about the extracted object to the server 2000 together with the identification information of the extracted object. For example, when the first terminal 100 extracts identification information of a flower object included in the first image, the first terminal 100 may transmit a request for reference painting information about the flower object to the server 2000 together with the identification information of the flower object.

In operation 930, the first terminal 100 may receive painting information of the second image including the extracted object from the server 2000. Herein, the painting information of the second image including the extracted object may be a painted second image.

Also, the first terminal 100 may only receive painting information of the object included in the second image, instead of receiving all the painting information of the second image. The painting information of the object may include color information, brightness information, chroma information, gradation value information, and texture information of the object.

In operation 940, the first terminal 100 may display the painting information of the second image received from the server 2000, on the screen of the first terminal 100.

According to an exemplary embodiment, the first terminal 100 may display the painted second image on a predetermined region of the screen. The object included in common in the first image may be painted in the painted second image.

Figure 10:
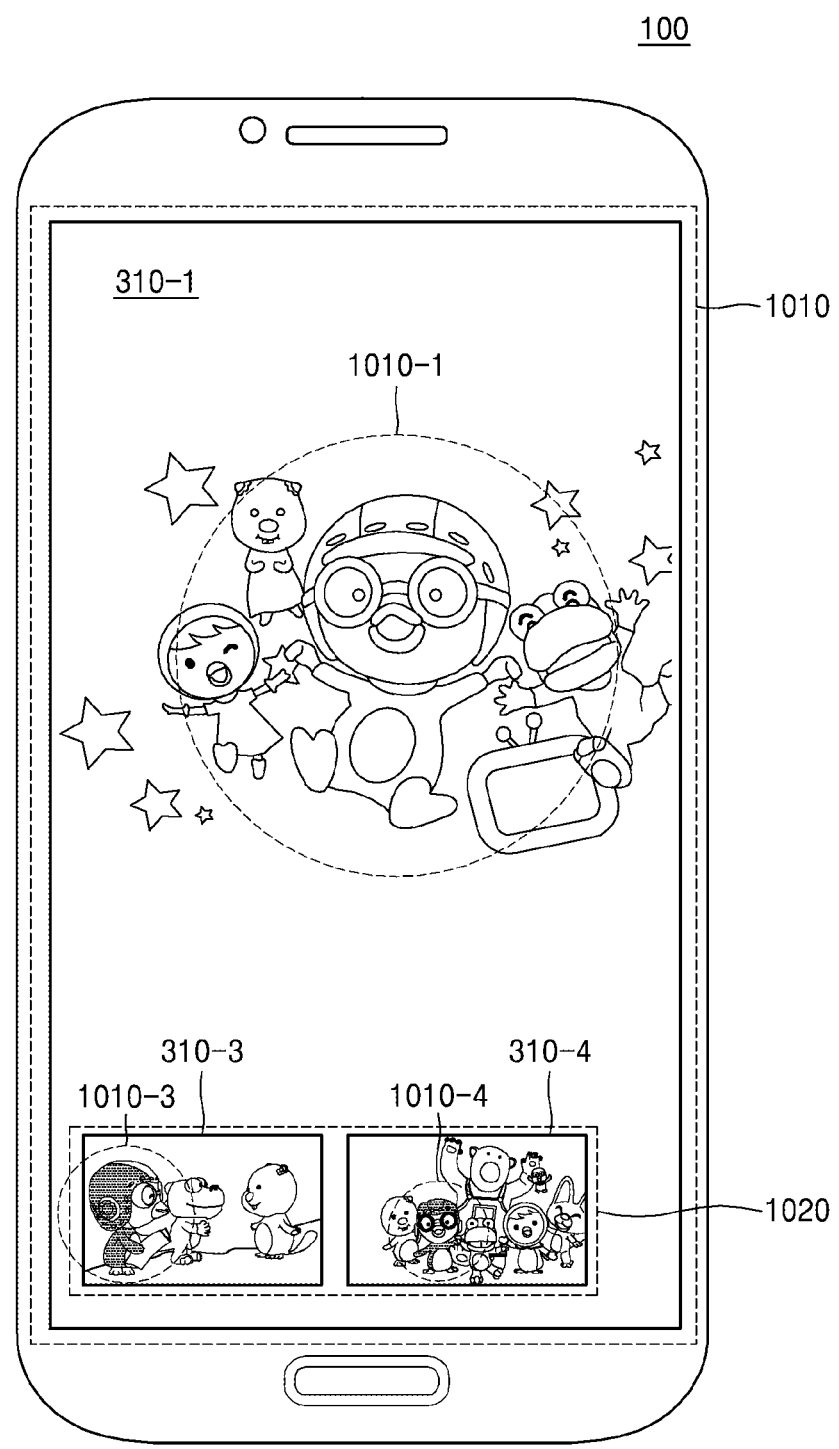
FIG. 10 is a diagram illustrating an example in which a terminal provides painting information of a second image including an object, according to an exemplary embodiment.

FIG. 10 is a diagram illustrating an example in which a terminal provides painting information of a second image including an object, according to an exemplary embodiment.

Referring to FIG. 10, the first terminal 100 may display a paintable first image 310-1 on a first region 1010 of the screen of the first terminal 100.

Also, the first terminal 100 may display painting information of second images 310-3 and 310-4 related to the first image 310-1 as reference painting information about the first image 310-1 on a second region 1020. According to an exemplary embodiment, the second images 310-3 and 310-4 may include an object included in the first image 310-1. For example, the second images 310-3 and 310-4 may include an object P 1010-1 (e.g., a Pororo object) included in the first object 310-1. Referring to FIG. 10, an object 1010-3 identical to the object P 1010-1 of the first image 310-1 may be included in a left portion of the image 310-3. Also, an object 1010-4 identical to the object P 1010-1 of the first image 310-1 may be included in a center portion of the image 310-4.

The first terminal 100 may extract the object P from the first image 310-1. According to an exemplary embodiment, the first terminal 100 may extract the object P based on a user input. For example, when the user touches the object P displayed on the first image 310-1, the first terminal 100 may extract the object P. The first terminal 100 may extract identification information about the object P.

The first terminal 100 may transmit a request for reference painting information about the object P to the server 2000 together with the identification information of the object P. The server 2000 may detect painting information related to the object P, based on the received identification information of the object P. The first terminal 100 may receive painting information of the second images 310-3 and 310-4 including the object P from the server 2000. According to an exemplary embodiment, the painting information of the second images 310-3 and 310-4 may be painted second images 310-3 and 310-4. For example, the first terminal 100 may receive the second images 310-3 and 310-4 including a painted object P.

The first terminal 100 may display the received second images 310-3 and 310-4 on the second region 1020 of the screen of the first terminal 100. The user may acquire painting information of the object P included in the first image 310-1 from the displayed second images 310-3 and 310-4. For example, when the object P included in the image 310-4 is painted in a blue color, the user may paint the object P included in the first image 310-1 in a blue color according to the acquired painting information.

According to an exemplary embodiment, the first terminal 100 may display the reference painting information for a predetermined period of time. For example, the first terminal 100 may display the reference painting information only when the user maintains a touch input for a predetermined period of time or more. This will be described below in detail with reference to FIG. 11.

Figure 11A:
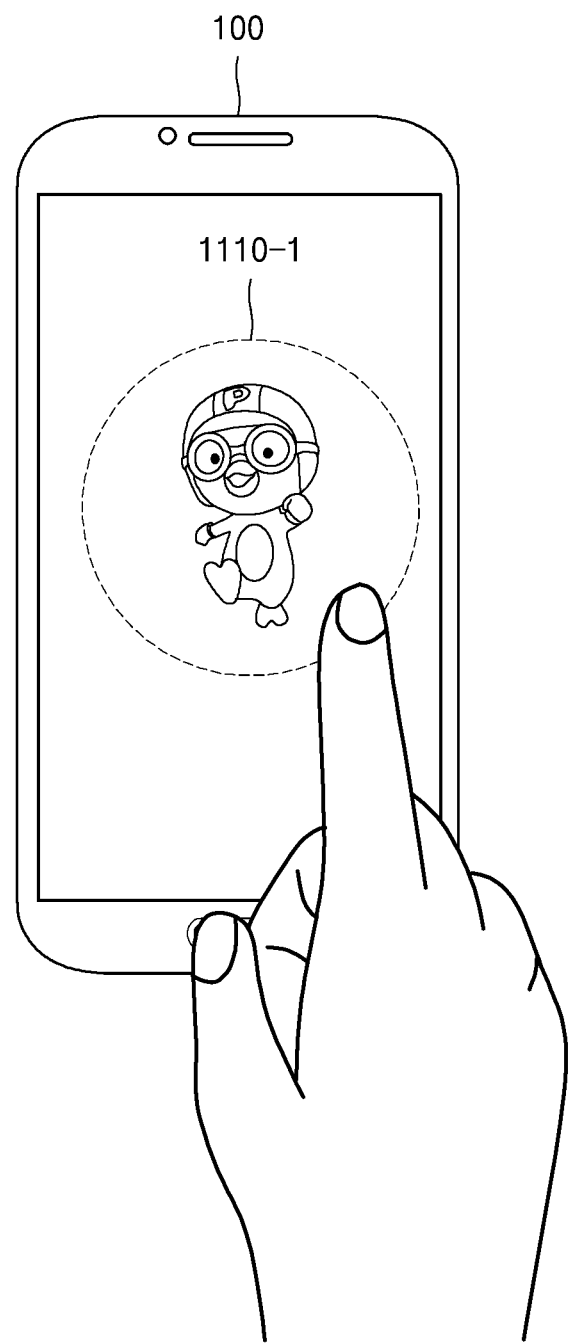
FIGS. 11A-11C and 12A-12C are diagrams illustrating examples in which a terminal provides painting information about an object, according to exemplary embodiments.
Figure 11B:
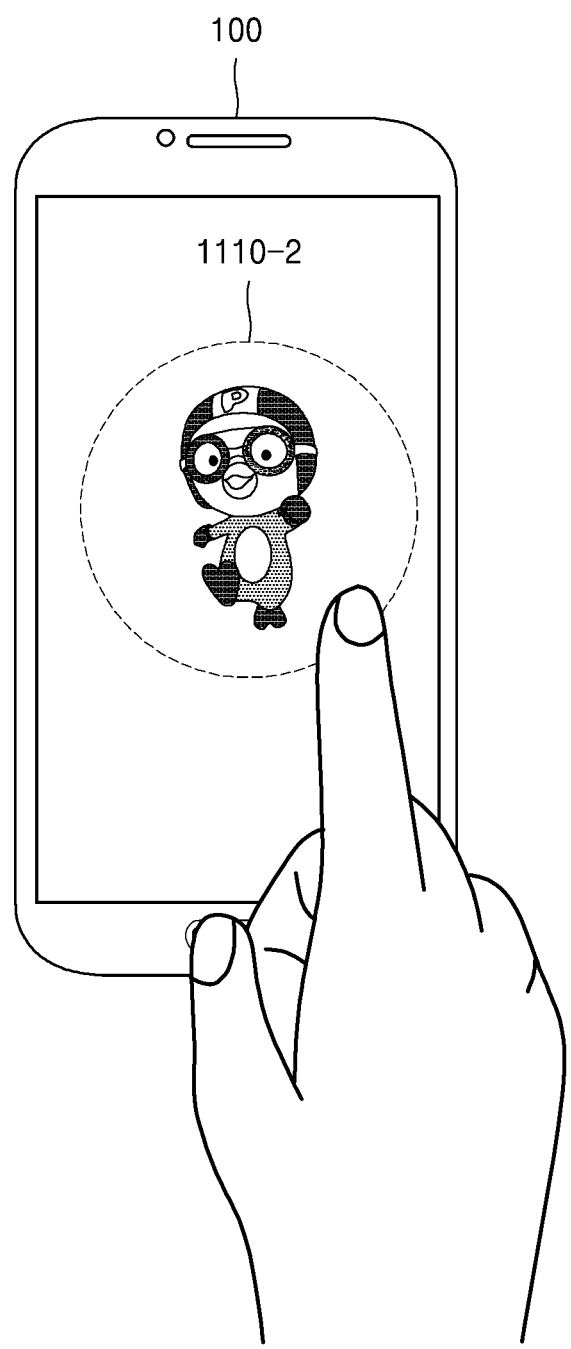
Figure 11C:
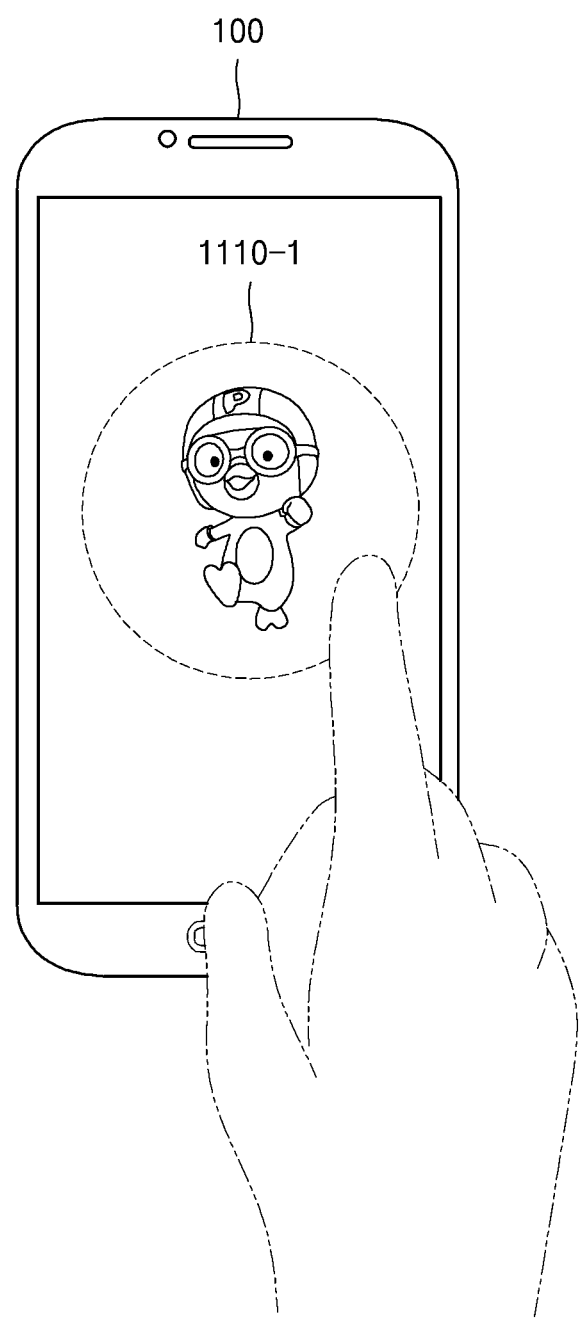

FIGS. 11A-11C are diagrams illustrating an example in which a terminal provides painting information about an object, according to an exemplary embodiment.

As illustrated in FIG. 11A, the first terminal 100 may display a paintable first image. In this case, the first terminal 100 may receive a user input of touching an object 1110-1 included in the first image.

As illustrated in FIG. 11B, when a touch input to the object 1110-1 is maintained for a predetermined period of time or more, the first terminal 100 may display reference painting information about the object 1110-1 in such a way that the reference painting information about the object 1110-1 overlaps the object 1110-1. Referring to FIG. 11B, a painted object 1110-2 may be displayed on the screen of the first terminal 100. For example, the reference painting information about the object 1110-1 may include color information, brightness information, chroma information, transparency information, gradation value information, and texture information of the object 1110-1.

As illustrated in FIG. 11C, when a touch input to the object 1110-1 is terminated, the first terminal 100 may no longer display the reference painting information about the object 1110-1.

Figure 12A:
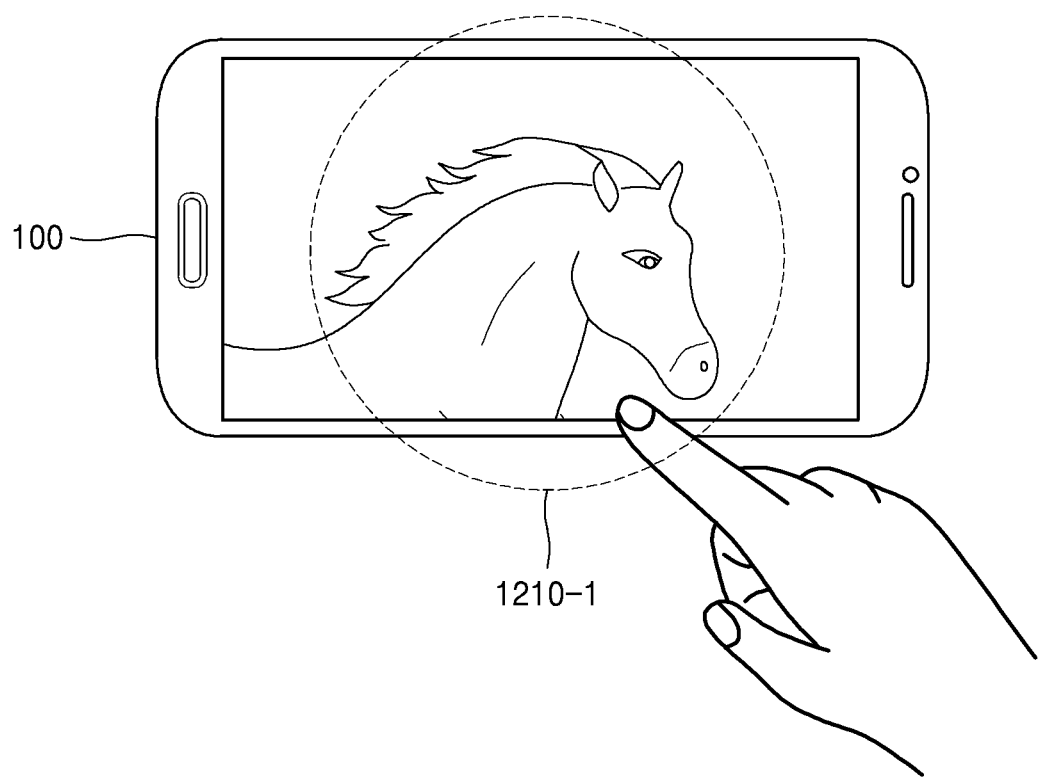
Figure 12B:
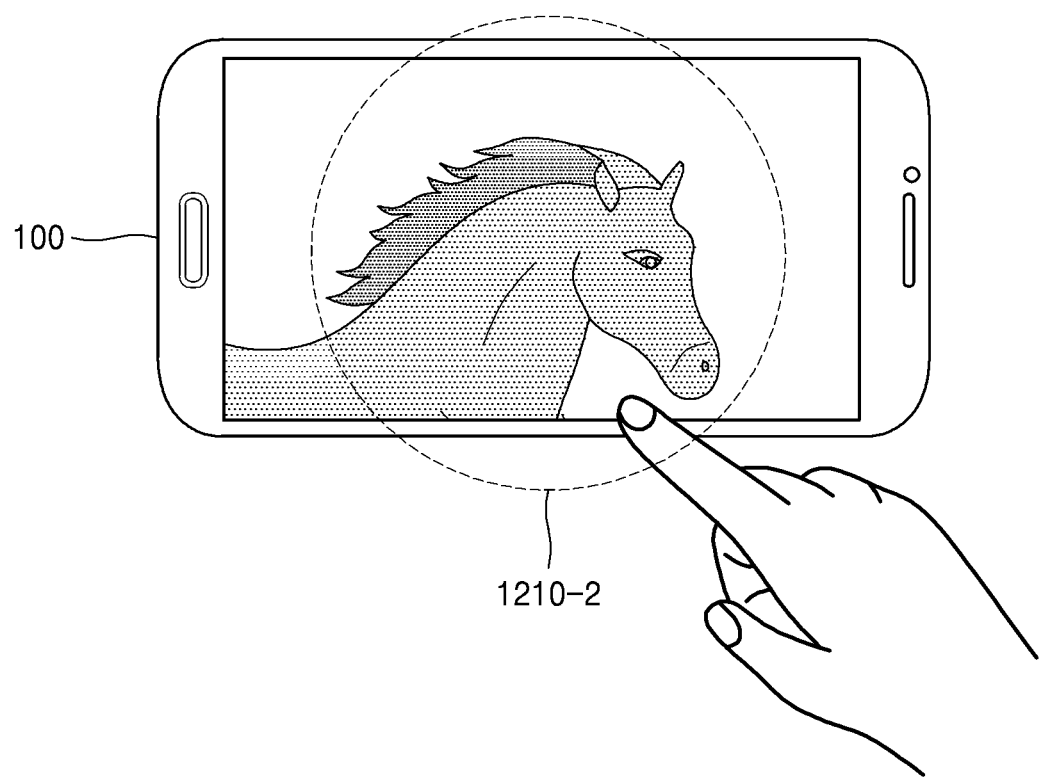
Figure 12C:
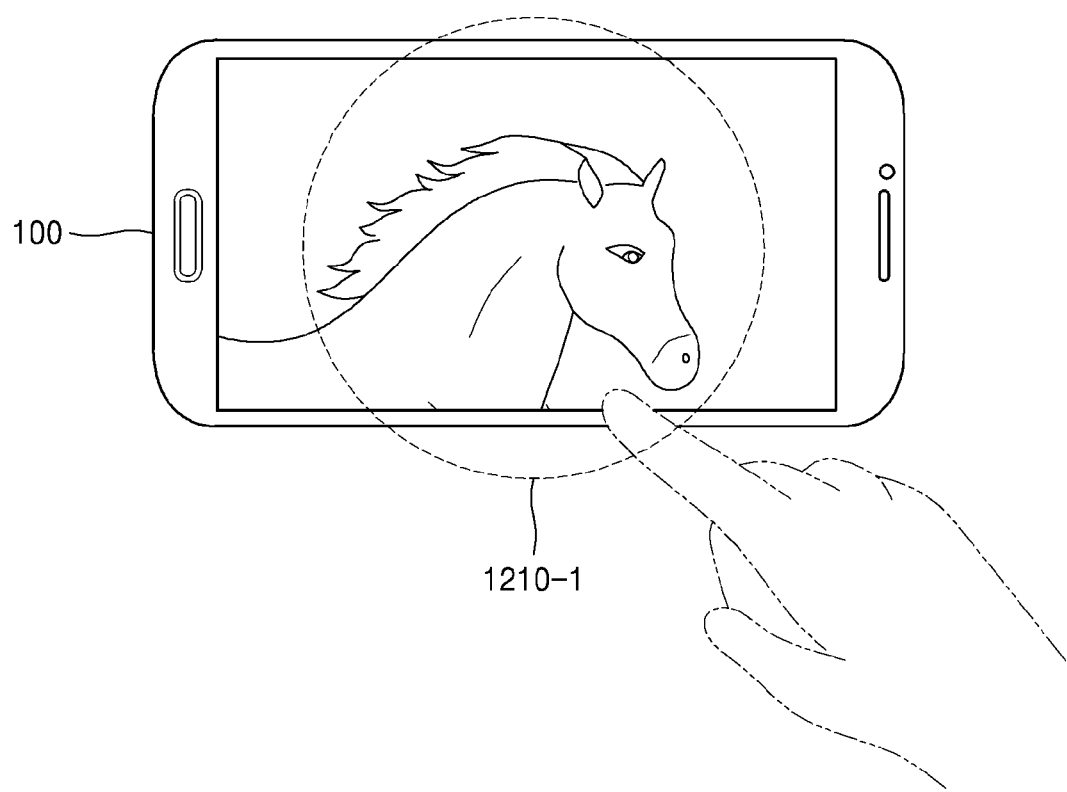

FIGS. 12A-12C are diagrams illustrating an example in which a terminal provides painting information about an object, according to an exemplary embodiment.

As illustrated in FIG. 12A, the first terminal 100 may display a paintable first image. In this case, the first terminal 100 may receive a user input of touching an object C 1210-1 included in the first image. According to an exemplary embodiment, the first image may be one of sub-images into which an image is divided.

As illustrated in FIG. 12B, when a touch input to the object 1210-1 is maintained for a predetermined period of time or more, the first terminal 100 may display reference painting information about the object 1210-1 in such a way that the reference painting information about the object 1210-1 overlaps the object 1210-1. Referring to FIG. 12B, a painted object 1210-2 may be displayed on the screen of the first terminal 100.

For example, the reference painting information about the object 1210-1 may be information about a partial region of the object 1210-1 included in a second image. For example, the first image may be an image including a horse head object. The first terminal 100 may acquire reference painting information about the horse head object included in the first image from painting information of the second image including a horse body object. When the horse body object included in the second image is painted in a brown color, the user may paint the horse head object included in the first image in a brown color with reference to the brown color of the horse body object. Accordingly, the user may consistently paint the sub-images.

As illustrated in FIG. 12C, when a touch input to the object 1210-1 is terminated, the first terminal 100 may no longer display the reference painting information about the object 1210-1.

Figure 13:
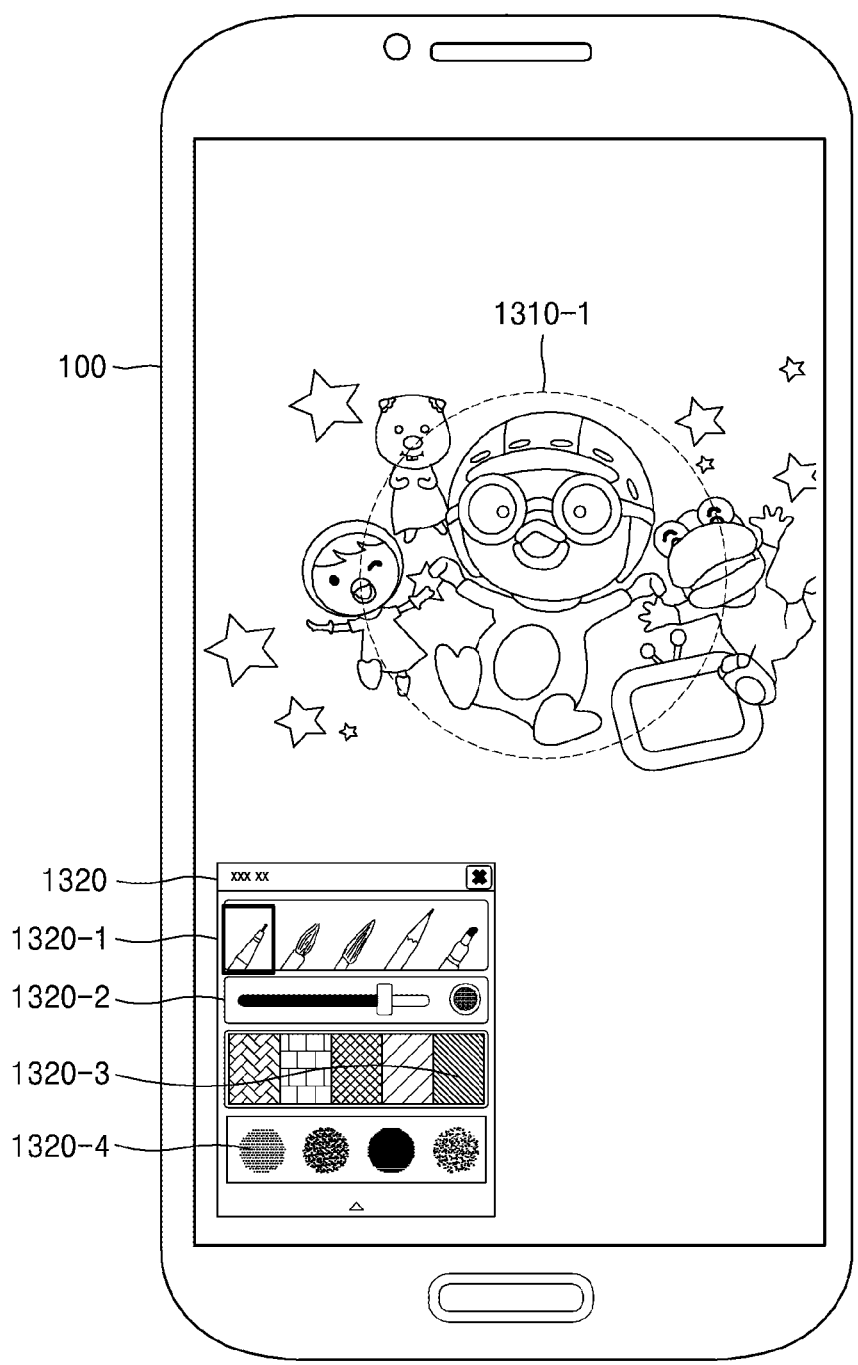
FIG. 13 is a diagram illustrating an example in which a terminal provides painting information about an object by displaying the painting information on a painting information setting window of a screen, according to an exemplary embodiment.

FIG. 13 is a diagram illustrating an example in which a terminal provides painting information about an object by displaying the same on a painting information setting window of a screen, according to an exemplary embodiment.

Referring to FIG. 13, when the first terminal 100 receives reference painting information (e.g., reference painting information of an object included in a second image), the first terminal 100 may display a painting information setting window. In this case, the first terminal 100 may apply and display the reference painting information received from the server 2000 on the painting information setting window. The first terminal 100 may receive painting information of an object 1310-1 included in the second image from the server 2000 as a result of a request for painting information of the second image related to the object D 1310-1.

According to an exemplary embodiment, the painting information of the object 1310-1 included in the second image may include color information and thickness information of lines used in object painting. Also, the painting information of the object D 1310-1 may include type information of a painting tool such as a pen, a pencil, or a brush, and size information of points for drawing a line. Information elements included in the painting information of the object 1310-1 may be stored in fields corresponding to the information elements in a predetermined data structure.

The painting information of the object 1310-1 included in the second image and received from the server 2000 may be displayed on the screen of the first terminal 100 through a painting information setting window 1320. Type information 1320-1 of a painting tool used in object painting, thickness information 1320-2 of a line, color information 1320-3, and size information 1320-4 of points for drawing a line may be displayed on the painting information setting window 1320.

For example, when the user selects the object 1310-1 displayed on the screen of the first terminal 100, each item of the painting information setting window 1320 may be selected based on the painting information of the object 1310-1 included in the second image and received from the server 2000. For example, the object 1310-1 in the second object may be painted in a blue color by using a color pencil. In this case, a point size of the color pencil may be 4 points and a thickness thereof may be 10. Each painting information element of the second image may be displayed on each item of the painting information setting window 1320 displayed on the screen of the first terminal 100. For example, a painting information element of a color pencil may be displayed on an item of the type information 1320-1 of a painting tool, a painting information element of 10 may be displayed on an item of the thickness information 1320-2 of a line, a painting information element of a blue color may be displayed on an item of the color information 1320-3, and a painting information element of 4 points may be displayed on an item of the size information 1320-4 of points for drawing a line.

Figure 14:
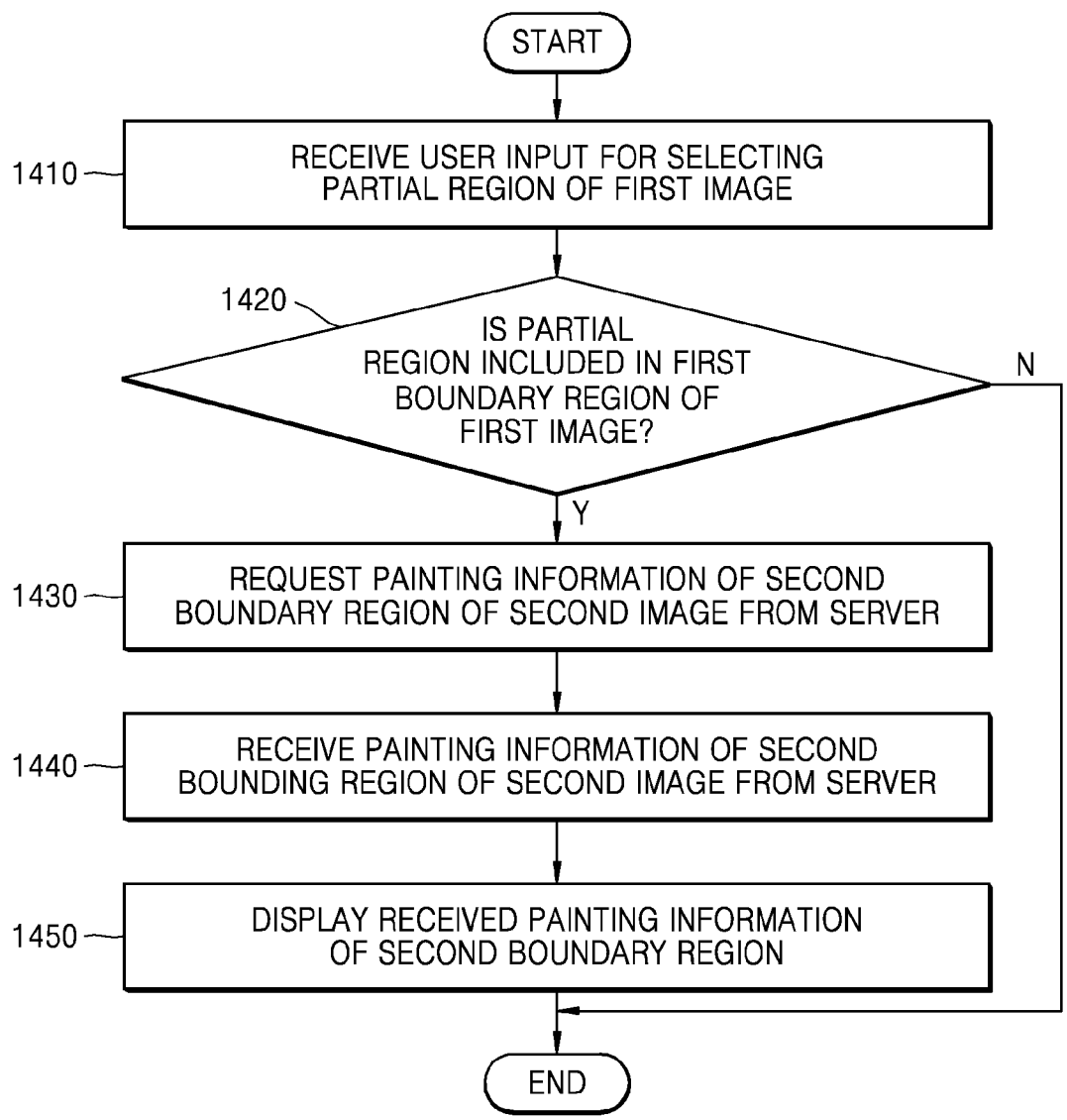
FIG. 14 is a flowchart illustrating a method in which a terminal provides painting information about a boundary region of an image, according to an exemplary embodiment.

FIG. 14 is a flowchart of a method in which the first terminal 100 provides painting information about a boundary region of an image, according to an exemplary embodiment.

In operation 1410, the first terminal 100 may receive a user input for selecting a point included in a first image. The first image may be one of sub-images into which an image is divided.

In operation 1420, the first terminal 100 may determine whether the point selected by the user is included in a first boundary region of the first image. Herein, the first boundary region may be a partial region of the first image that is located within a predetermined distance from a division line of the first image and a second image.

Also, a second boundary region may be a partial region of the second image that is located within a predetermined distance from the division line of the first image and the second image.

In operation 1430, when the partial region selected by the user is included in the first boundary region, the first terminal 100 may request painting information of the second boundary region of the second image from the server 2000.

In operation 1440, the first terminal 100 may receive painting information of the second boundary region of the second image from the server 2000. According to an exemplary embodiment, the first terminal 100 may receive a painted image of the second boundary region as the painting information of the second boundary region.

In operation 1450, the first terminal 100 may display the received painting information of the second boundary region on the screen. According to an exemplary embodiment, the first terminal 100 may display the painted image of the second boundary region on the screen. The image of the second boundary region may or may not overlap with the first image displayed on the first terminal 100.

Figure 15:
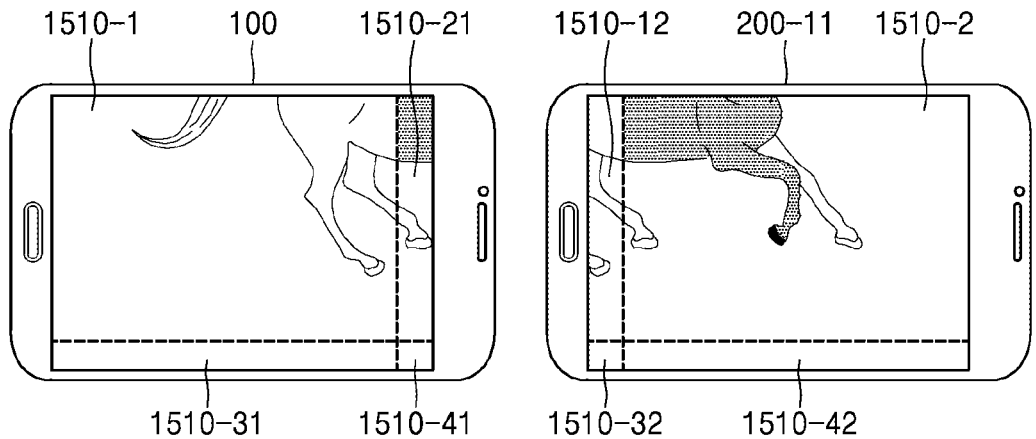
FIG. 15 is a diagram illustrating an example of providing painting information of a boundary region, according to an exemplary embodiment.

FIG. 15 is a diagram illustrating an example of providing painting information of a boundary region, according to an exemplary embodiment.

Referring to FIG. 15, a first image 1510-1, which is one of sub-images into which an image is divided, may be transmitted to the first terminal 100, and a second image 1510-2, which is another of the sub-images into which the image is divided, may be transmitted to the second terminal 200-11.

According to an exemplary embodiment, the first image 1510-1 may be displayed on the screen of the first terminal 100. Also, together with the first image 1510-1, painting information of the second image 1510-2 adjacent to the first image 1510-1 may be displayed on the screen of the first terminal 100. For example, a boundary region 1510-21, which is adjacent to the first image 1510-1 and is included in the second image 1510-2, may be displayed on the screen of the first terminal 100. Also, a boundary region 1510-31, which is adjacent to the first image 1510-1 and is included in another sub-image, may be displayed on the screen of the first terminal 100. Also, a boundary region 1510-41, which is adjacent to the first image 1510-1 and is included in another sub-image, may be displayed on the screen of the first terminal 100.

Likewise, a boundary region 1510-12, which is adjacent to the second image 1510-2 and is included in the first image 1510-1, may be displayed on the screen of a second terminal 200-11. Also, a boundary region 1510-32, which is adjacent to the second image 1510-2 and is included in another sub-image, may be displayed on the screen of the second terminal 200-11. Also, a boundary region 1510-42, which is adjacent to the second image 1510-2 and is included in another sub-image, may be displayed on the screen of the second terminal 200-11.

According to another exemplary embodiment, the first terminal 100 may receive a user input for selecting a point of the first image 1510-1. For example, the first terminal 100 may receive a user input for selecting a point at which a portion of a horse object included in the first image 1510-1 is displayed.

The first terminal 100 may determine whether the point selected by the user is included in a first boundary region of the first image 1510-1. For example, when the point selected by the user is included in a region of the first image 1510-1 that is within a distance of about 1 centimeter from a division line between the first image 1510-1 and the second image 1510-2, the point selected by the user may be included in the first boundary region.

Also, a second boundary region may be a region of the second image 1510-2 that is within a distance of about 1 centimeter from the division line of the first image 1510-1 and the second image 1510-2.

Since the point selected by the user is included in the first boundary region, the first terminal 100 may receive painting information of the second boundary region from the server 2000. According to an exemplary embodiment, the first terminal 100 may receive a painted image of the second boundary region as the painting information of the second boundary region.

The first terminal 100 may display the received painting information of the second boundary region on the screen. According to an exemplary embodiment, the first terminal 100 may display the painted image of the second boundary region. According to another exemplary embodiment, the first terminal 100 may display the painting information of the second boundary region that is most adjacent to the point selected by the user. For example, when a coordinate of the point selected by the user is (x,y), the first terminal 100 may display painting information of a point in the second boundary region that is closest to the coordinate (x,y).

The first terminal 100 may display the painting information of the second boundary region on a region that is within a predetermined range from the point selected by the user. For example, the first terminal 100 may display the painting information of the second boundary region on a region that is within a radius of about 50 millimeters from the point selected by the user.

Figure 16:
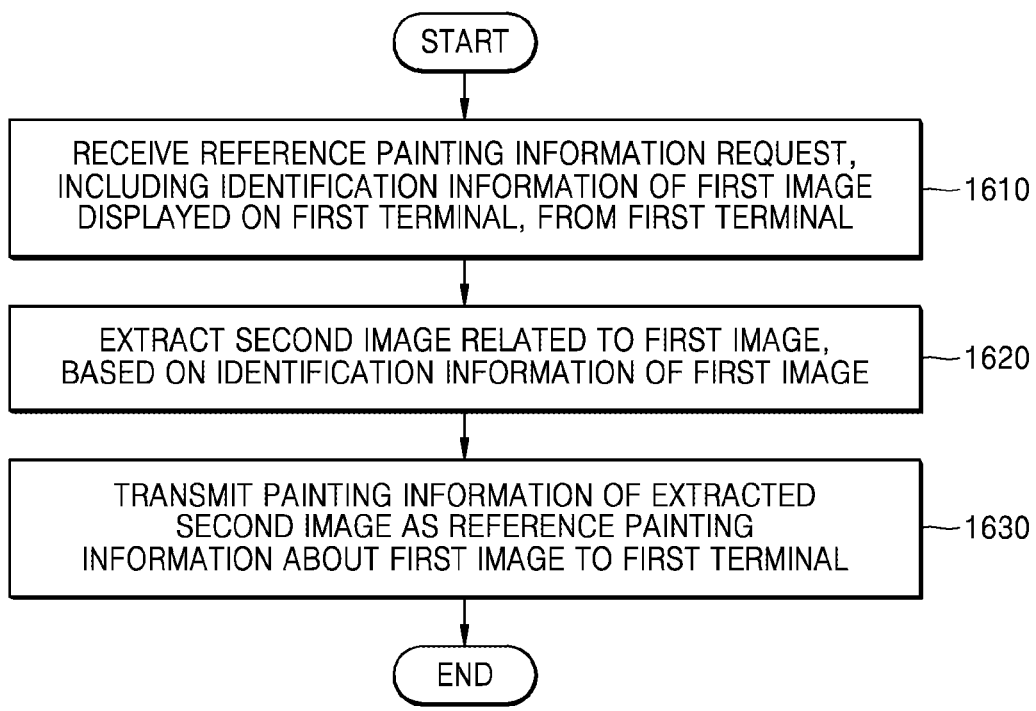
FIG. 16 is a flowchart illustrating a method in which a server provides image painting information, according to an exemplary embodiment.

FIG. 16 is a flowchart of a method in which the server 2000 provides image painting information, according to an exemplary embodiment.

In operation 1610, the server 2000 may receive a reference painting information request, including identification information of a first image displayed on the first terminal 100, from the first terminal 100. Herein, the reference painting information may include painting information of an image related to a displayed image (e.g., an image including the same object as the displayed image or an image connectable with the displayed image).

According to an exemplary embodiment, the reference painting information request may be transmitted from the first terminal 100 to the server 2000 based on a user input signal requesting reference painting information about the first image. The identification information of the first image may include at least one of identification information about the first image and identification information of each object included in the first image.

The identification information of the first image may be information set by the server 2000. The server 2000 may allocate an identification value to the first image before distributing the first image to the first terminal 100.

The identification information of the first image may be set by the server 2000. For example, the server 2000 may group four cartoon images having temporal relations therebetween and allocate an identification value "Cartoon1" to the group in order to indicate that the four cartoon images have relations therebetween. Also, the server 2000 may set marks "Scene 1, Scene 2, Scene 3, and Scene 4" to identification information of the respective images so that the four cartoon images included in the group Cartoon1 may be discriminated from each other. That is, the server 2000 may set an identification mark "Cartoon1" and an identification mark "Scene1" to the first image.

According to another exemplary embodiment, the server 2000 may set identification information about objects included in the first image. In detail, the server 2000 may extract objects having a predetermined value or more of similarity between the first image and images related to the first image and set the same identification information to the extracted objects. For example, when the similarity between a flower object included in the first image and a flower object included in the second image has a predetermined value or more, the same identification information may be set to the flower object included in the first image and the flower object included in the second image. In operation 1620, the server 2000 may extract the second image related to the first image, based on the received identification information of the first image.

Herein, the related images may include a plurality of images having temporal relations therebetween, or a plurality of sub-images into which an image is divided.

According to an exemplary embodiment, the server 2000 may extract the second image from the painting information database included in the server 2000, based on the identification information of the first image. For example, when the identification mark of the group information included in the first image is Cartoon1, the server 2000 may extract the second image having a group identification mark "Cartoon1" from the painting information database.

According to another exemplary embodiment, the server 2000 may extract a third image from the painting information database included in the server 2000, based on the identification information of an object included in the first image. Herein, when the second image includes the object, the third image may include the second image. For example, when the identification mark of the object included in the first image is P, the server 2000 may extract an object having an identification mark "P" from the painting information database.

However, a method in which the server 2000 extracts the second image is not limited thereto. For example, the server 2000 may request painting information of the second image from the second terminal 200 including the second image related to the first image, based on the identification information of the first image received from the user. The server 2000 may receive painting information of the second image from the second terminal 200 as a response to the request.

In operation 1630, the server 2000 may transmit the painting information of the extracted second image as the reference painting information about the first image to the first terminal.

According to an exemplary embodiment, the painting information of the second image may include a painted second image. According to another exemplary embodiment, the painting information of the second image may include painting information of an object included in the third image. The server 2000 may transmit painting information of a boundary region of the second image as the painting information of the second image to the first terminal 100. The boundary region of the second image may be a partial region of the second image that is located within a predetermined distance from a division line of the first image and the second image. Herein, the first image and the second image may be sub-images into which an image is divided.

Figure 17:
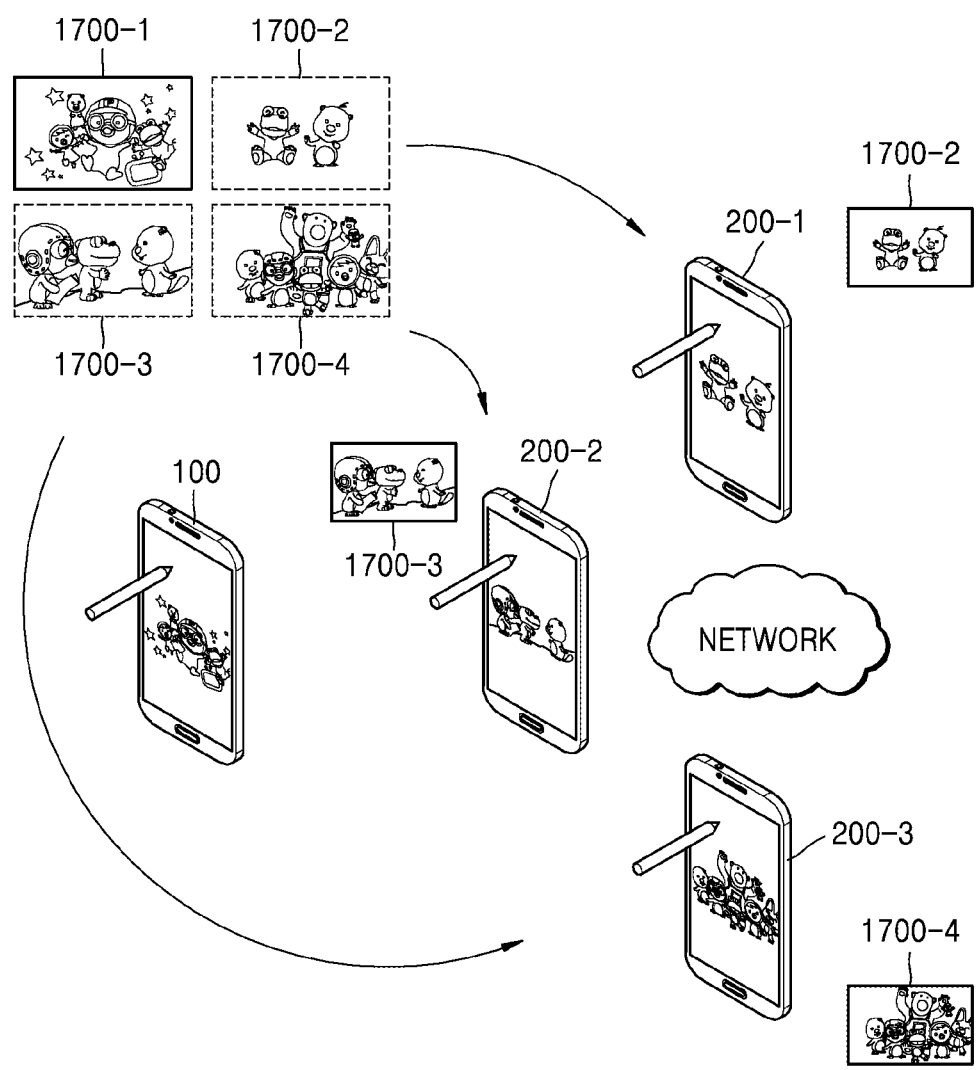
FIG. 17 is a schematic diagram illustrating a system for providing image painting information, according to an exemplary embodiment.

FIG. 17 is a schematic diagram illustrating a system for providing image painting information, according to another exemplary embodiment.

Referring to FIG. 17, the system for providing image painting information may include a plurality of terminals 100, 200-1, 200-2, and 200-3. In FIG. 17, only elements related to the present exemplary embodiment are illustrated. Therefore, those of ordinary skill in the art will understand that the system may further include other general-purpose components in addition to the components illustrated in FIG. 17.

According to an exemplary embodiment, the terminals 100, 200-1, 200-2, and 200-3 may be terminals that provide images that may be painted by users. For example, each of the terminals 100, 200-1, 200-2, and 200-3 may display a paintable image on a screen and receive painting information about a displayed image from the user. Also, each of the terminals 100, 200-1, 200-2, and 200-3 may apply the painting information to the displayed image. Also, the terminals 100, 200-1, 200-2, and 200-3 may share received painting information with each other.

For convenience of description, the terminal 100 requesting imaging painting information will be referred to as a first terminal 100, and at least one of the other terminals 200-1, 200-2, and 200-3 will be referred to as a second terminal 200. Also, for convenience of description, an image displayed on the first terminal 100 will be referred to as a first image, and an image displayed on the second terminal 200 will be referred to as a second image.

The first terminal 100 may receive the first image from a master terminal. The master terminal may be any one of the terminals 100, 200-1, 200-2, and 200-3. Also, the first terminal 100 may communicate with the second terminal 200. According to an exemplary embodiment, the first terminal 100 may transmit painting information of the first image to the second terminal 200. For example, the first terminal 100 may broadcast the painting information of the first image by a communication scheme such as WiFi or BLE. Also, the first terminal 100 may receive painting information of the second image from the second terminal 200.

The first terminal 100 may be embodied in various forms. For example, the first terminal 100 described herein may be a mobile phone, a smartphone, a laptop computer, or a tablet PC, but is not limited thereto.

The second terminal 200 may receive the second image from the master terminal. Also, the second terminal 200 may communicate with the first terminal 100. According to an exemplary embodiment, the second terminal 200 may transmit painting information of the second image to the first terminal 100. For example, the second terminal 200 may broadcast the painting information of the second image by a communication scheme such as WiFi or BLE. Also, the second terminal 200 may receive painting information of the first image from the first terminal 100.

The second terminal 200 may be embodied in various forms. For example, the second terminal 200 described herein may be a mobile phone, a smartphone, a laptop computer, or a tablet PC, but is not limited thereto.

Hereinafter, a method of providing image painting information between the first terminal 100 and the second terminal 200 will be described in detail with reference to FIG. 18.

Figure 18:
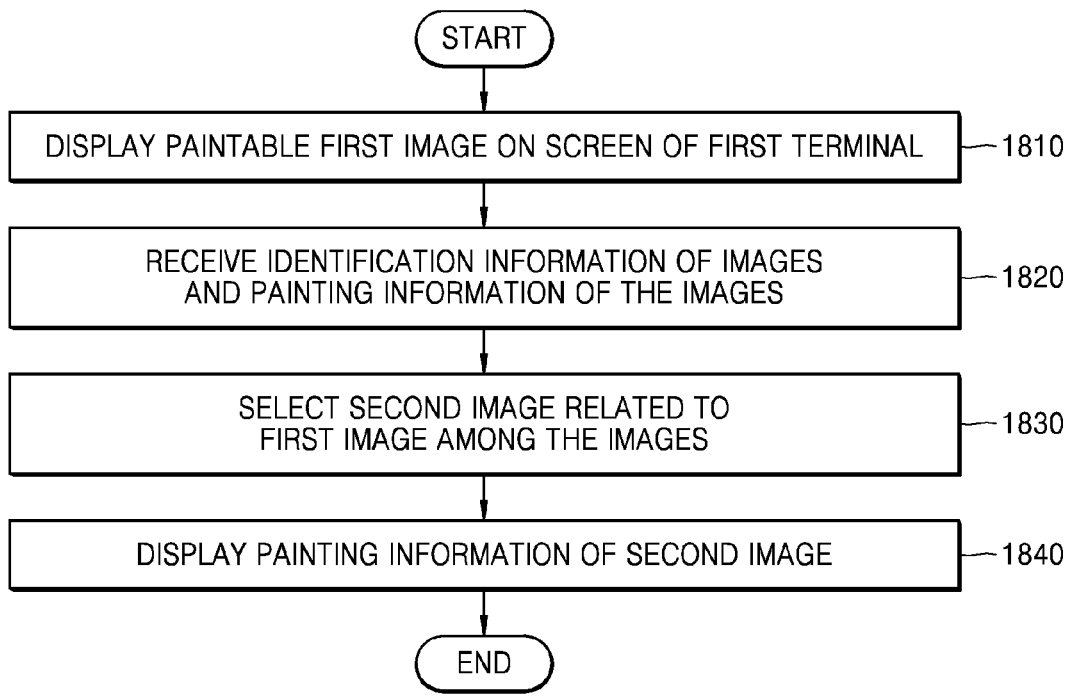
FIG. 18 is a flowchart illustrating a method in which a terminal provides image painting information, according to an exemplary embodiment.

FIG. 18 is a flowchart of a method in which a terminal provides image painting information, according to an exemplary embodiment.

Referring to FIG. 18, in operation 1810, the first terminal 100 may display a paintable first image on the screen of the first terminal 100. The paintable first image may be one of a plurality of images which are related to each other. The related images may include a plurality of images having temporal relations therebetween, or a plurality of sub-images into which an image is divided.

According to an exemplary embodiment, the first terminal 100 may receive the first image from a master terminal. The master terminal may be any one of the terminals 100, 200-1, 200-2, and 200-3. The master terminal may distribute a plurality of images to the terminals 100, 200-1, 200-2, and 200-3, respectively. For example, the master terminal may transmit the first image to the first terminal 100 and transmit the second image to the second terminal 200.

In operation 1820, the first terminal 100 may receive a user input requesting reference painting information about the first image. The reference painting information may be painting information of an image related to the displayed image (e.g., an image including the same object as the displayed image or an image connectable with the displayed image).

The user may request the reference painting information from the first terminal 100 by using an input device such as a mouse or a keyboard, or by touching the screen; however, exemplary embodiments are not limited thereto.

In operation 1830, the first terminal 100 may select the second image related to the first image, among a plurality of images received from an external device. According to an exemplary embodiment, the first terminal 100 may receive images broadcast from an external device. The first terminal 100 may select the second image related to the first image, among the received images, based on the identification information of the first image.

For example, when the identification mark of the group information included in the first image is Cartoon1, the first terminal 100 1 may extract the second image having a group identification mark "Cartoon1" from among the received images.

According to another exemplary embodiment, the server 2000 may extract the painting information of the object included in the second image, based on the identification information of the object included in the first image. For example, when the identification mark of the object included in the first image is P, the first terminal 100 may extract an object having an identification mark "P" in the second image.

In operation 1840, the first terminal 100 may display painting information of the second image on the screen. According to an exemplary embodiment, the painting information of the second image may include a painted second image. According to another exemplary embodiment, the painting information of the second image may include painting information of the object included in the second image.

The painting information of the second image may be painting information of a boundary region of the second image. The boundary region of the second image may be a partial region of the second image that is located within a predetermined distance from a division line of the first image and the second image. Herein, the first image and the second image may be sub-images into which an image is divided.

According to an exemplary embodiment, the first terminal 100 may display the received painting information of the second image on a predetermined region of the screen. For example, the painting information of the second image may be displayed on an edge region of the screen of the first terminal 100. Also, the painting information of the second image may be displayed to overlap the first image displayed on the screen. However, these locations of the painting information of the second image are only exemplary.

When the user touches a predetermined region on which the painting information of the second image is displayed, the painting information of the second image may be displayed fully on the screen. Also, when the user again touches the screen, the painting information of the second image may be removed from the screen and the first image may be displayed on the screen.

According to another exemplary embodiment, the painting information of the second image may be displayed on the screen of the first terminal 100 for a predetermined period of time. For example, when the user sets a painting information display time to five seconds, the painting information of the second image may be displayed on the screen of the first terminal 100 for five seconds.

According to another exemplary embodiment, the painting information of the second image may be displayed on the screen of the first terminal 100 while the user is performing a touch input to the first image displayed on the screen of the first terminal 100. For example, when the user performs a touch input to a portion of the first image, in which an apple object is displayed, the painting information of the second image related to the apple object may be displayed on the apple object while the touch input is being performed.

Also, the painting information of the second image may be displayed on a region that is within a predetermined distance from a point touched by the user. For example, when the user performs a touch input to a portion of the first image, in which a horse object is displayed, the painting information of the second image about the horse object may be displayed on a region that is within a radius of about 50 millimeters from a point touched by the user.

According to an exemplary embodiment, the first terminal 100 may broadcast the identification information of the first image and the painting information of the first image. For example, the first terminal 100 may broadcast the identification information of the first image and the painting information of the first image by a communication scheme such as WiFi, BLE, or WiFi Dinner.

The second terminal 200 may receive the identification information of the first image and the painting information of the first image that are broadcast from the first terminal 100. The second terminal 200 may acquire reference painting information of the second image based on the identification information of the first image and the painting information of the first image that are received from the first terminal 100.

Figure 19:
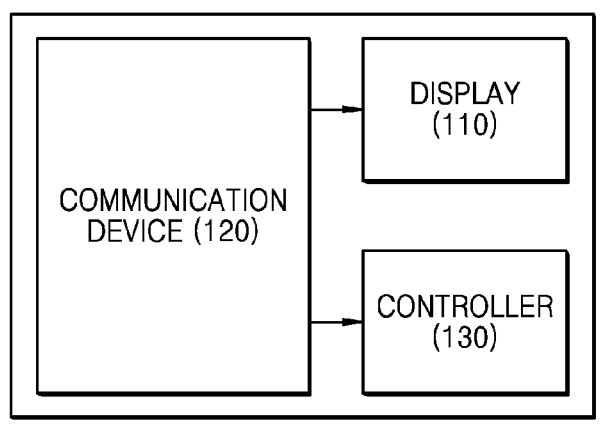
FIGS. 19 and 20 are block diagrams of a terminal for providing image painting information, according to exemplary embodiments.
Figure 20:
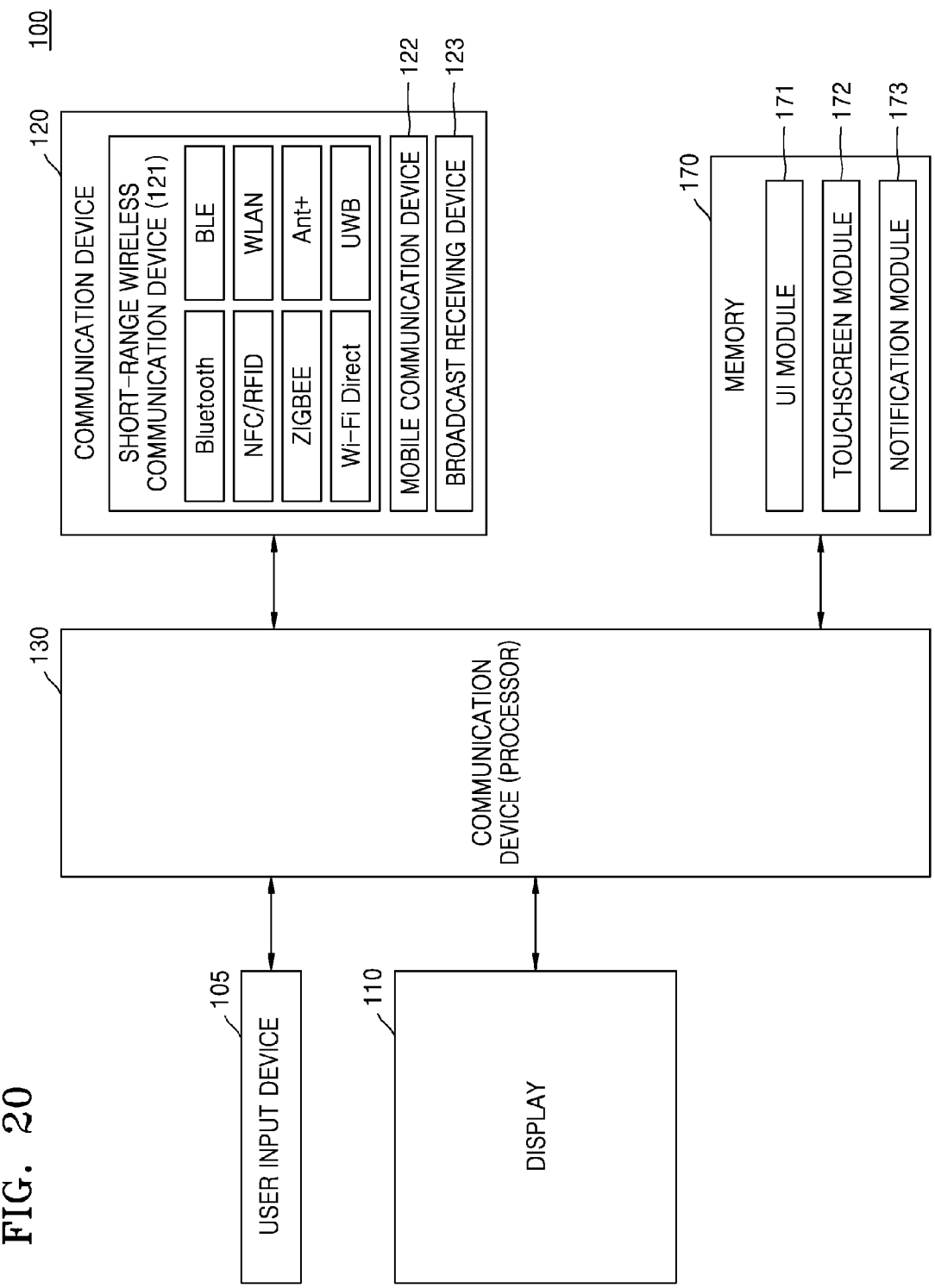

FIGS. 19 and 20 are block diagrams of the first terminal 100 for providing image painting information, according to exemplary embodiments.

As illustrated in FIG. 19, the first terminal 100 according to an exemplary embodiment may include a display 110, a communication device 120, and a controller 130. However, all of the illustrated components are not necessary components. The terminal 100 may include more or less components than the illustrated components.

For example, the terminal 100 may further include a user input device 105 and a memory 170 in addition to the display 110, the communication device 120, and the controller 130.

The above components will be described below.

The user input device 105 allows the user to input a signal requesting reference painting information of a first image displayed on the first terminal 100. For example, the user input device 105 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

The user input device 105 may receive a user input. For example, the user input device 105 may receive a user input for selecting an object included in the first image displayed on the screen of the first terminal 100.

The display 110 may display information processed in the first terminal 100. For example, the display 110 may display a first image received by the first terminal 100 and painting information of a second image related to the first image. According to an exemplary embodiment, the painting information of the second image may be a painted second image. The painting information of the second image may include painting information of an object included in the second image. Also, the painting information of the second image may include painting information of a boundary region included in the second image.

According to an exemplary embodiment, the display 100 may display the received painting information of the second image on a predetermined region of the display 110. When the user touches the predetermined region, the display 110 may display the painting information of the second image entirely on the display 110. Also, when the user again touches the display 110, the display 110 may remove the painting information of the second image and display only the first image.

According to another exemplary embodiment, the display 110 may display the painting information of the second image for a predetermined period of time. According to another exemplary embodiment, the display 110 may display the painting information of the second image while a touch input is being received from the user. Also, the display 110 may display the painting information of the second image on a region that is within a predetermined distance from a point touched by the user.

According to another exemplary embodiment, the display 110 may display the painting information of the second image by using a painting information setting window.

When the display 110 includes a touchscreen with a layer structure of a touch pad, the display 110 may be used as an input device in addition to an output device. The display 110 may include at least one of a liquid crystal display, a thin film transistor liquid crystal display, an organic light-emitting diode display, a flexible display, a three-dimensional (3D) display, and an electrophoretic display. Also, the first terminal 100 may include two or more displays 110 in some exemplary embodiments. In this case, the two or more displays 110 may be disposed to face each other through a hinge structure.

The communication device 120 may include one or more elements for allowing communication between the first terminal 100 and the second terminal 200 or between the first terminal 100 and the server 2000. For example, the communication device 120 may include a short-range wireless communication device 121, a mobile communication device 122, and a broadcast receiving device 123.

The short-range wireless communication device 121 may include, but is not limited to, a Bluetooth communication device, a Bluetooth Low Energy (BLE) communication device, a near field communication device, a WLAN (e.g., WiFi) communication device, a ZigBee communication device, an infrared data association (IrDA) communication device, a WiFi Direct (WFD) communication device, a ultra wideband (UWB) communication device, and Ant+ communication device.

The mobile communication module 122 transmits or receives wireless signals with at least one of a base station, an external terminal, and a server on a mobile communication network. Herein, the wireless signals may include voice call signals, video call signals, or various types of data for transmission or reception of text/multimedia messages.

The broadcast receiver 123 receives broadcast signals and/or broadcast-related information from external devices through broadcast channels. The broadcast channels may include satellite channels and terrestrial channels. In some exemplary embodiments, the first terminal 100 may not include the broadcast receiver 123.

The communication device 120 may transmit a signal requesting the reference painting information of the first image to the server 2000, and receive the painting information of the second image as the reference painting information of the first image from the server 2000.

The communication device 120 may transmit a request for the painting information of the second image related to the first image to the server 2000, based on a user input received by the user input 105.

The communication device 120 may receive the painting information of the second image from the server 2000 according to the request for the painting information of the second image. For example, the communication device 120 may receive a painted second image from the server 2000. The painting information of the object related to the first image may be included in the painted second image.

According to another exemplary embodiment, the communication 120 may receive the painting information of the object from the server 2000. For example, the communication device 120 may receive a second image including an object identical to the object extracted from the first image. Herein, the second image may be a painted image.

Also, the communication device 120 may receive painting information of the object as painting information about the object. According to an exemplary embodiment, the painting information of the object may include color information and thickness information of lines used in object painting. Also, the painting information of the object may include type information of a painting tool such as a pen, a pencil, or a brush, size information of points for drawing a line, and pressure information in line input. Information elements included in the painting information of the object may be stored in fields corresponding to the information elements according to a predetermined data structure.

According to another exemplary embodiment, the painting information of the second image received by the communication device 120 from the server 2000 may include the painting information of the second boundary region of the second image that is located within a predetermined distance from a division line between the first image and the second image.

The controller 130 controls an overall operation of the first terminal 100. For example, the controller 130 may extract the second image related to the first image, from data stored in the memory 170. Also, the controller 130 may control the user input 105 and the communication device 120.

The controller 130 may control the display 110 such that the received painting information of the second image is displayed on the screen of the first terminal 100.

According to an exemplary embodiment, the controller 130 may control the display 110 such that the display 110 may display the received painting information of the second image on a predetermined region of the screen.

According to another exemplary embodiment, the controller 130 may control the display 110 such that the display 110 displays the painting information of the object included in the second image on the object included in the first image for a predetermined period of time.

Also, the controller 130 may perform control such that the painting information of the object included in the second image is displayed through a predetermined painting information setting window. Color information and thickness information of lines used in object painting, type information of a painting tool, size information of points for drawing a line, and pressure information in the line input may be displayed on the predetermined painting information setting window.

According to another exemplary embodiment, the controller 130 may perform control such that the painting information of the second boundary region located within a predetermined distance from a division line between the first image and the second line is displayed on the first boundary region.

The memory 170 may store programs for processing and control of the controller 130 and may store input/output data (e.g., menus, first level sub-menus corresponding respectively to the menus, and second level sub-menus corresponding respectively to the first level sub-menus).

The memory 170 may include at least one type of storage medium among flash memory type, hard disk type, multimedia card micro type, card type memory (e.g., SD and XD memories), random access memory (RAM), static random access memory (SRAM), read-only memory (ROM), electronically erasable programmable read-only memory (EEPROM), programmable read-only memory (PROM), magnetic memory, magnetic disk, and optical disk. Also, the first terminal 100 may operate a cloud server or a web storage that performs a storage function of the memory unit 170 on the Internet.

The programs stored in the memory 170 may be classified into a plurality of modules according to their functions, and may be classified into, for example, a UI module 171, a touchscreen module 172, and a notification module 173.

The UI module 171 may provide a specialized UI and a GUI that interlock with the first terminal 100 for their respective applications. The touchscreen module 172 may sense a touch gesture of the user on a touchscreen and transfer information about the touch gesture to the controller 130. According to an exemplary embodiment, the touchscreen module 172 may detect and analyze a touch code. The touchscreen module 172 may include separate hardware including a controller.

Various sensors may be provided in or near the touchscreen to sense a proximity touch or a touch to the touchscreen. An example of the sensor for sensing a touch to the touchscreen is a tactile sensor. The tactile sensor refers to a sensor that senses a touch of an object at a degree of human sense or more. The tactile sensor may sense a variety of information, such as the roughness of a touch surface, the hardness of a touch object, and the temperature of a touch point.

An example of the sensor for sensing a touch to the touchscreen is a proximity sensor.

The proximity sensor is a sensor that detects the presence of an object approaching a predetermined detection surface or an object located in the proximity thereof without mechanical contact by using an electromagnetic force or infrared rays. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the touch gesture of the user may include tap, touch and hold, double tap, drag, panning, flick, drag and drop, and swipe.

Figure 21:
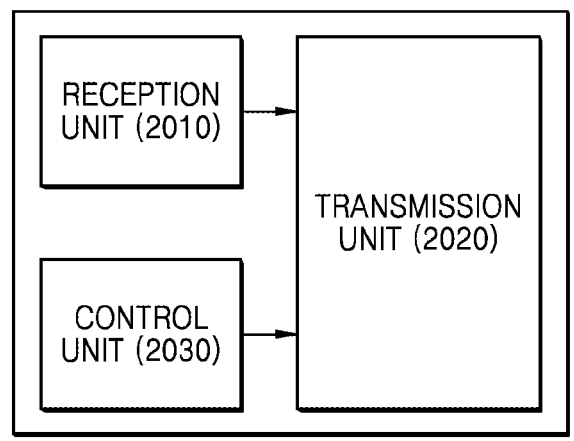
FIG. 21 is a block diagram of a server for providing image painting information, according to an exemplary embodiment.

FIG. 21 is a block diagram of the server 2000 for providing image painting information, according to an exemplary embodiment.

Referring to FIG. 21, the server 2000 may include a receiver 2010, a controller 2020, and a transmitter 2030.

In FIG. 21, only elements related to the present exemplary embodiment are illustrated. Therefore, those of ordinary skill in the art will understand that the server 2000 may further include other general-purpose components in addition to the components illustrated in FIG. 21.

According to an exemplary embodiment, the server 2000 described herein may be a mobile phone, a smartphone, a laptop computer, or a tablet PC, but is not limited thereto. For example, according to an exemplary embodiment, when an image painting information providing method is used in an educational activity in school, the server 2000 may be a tablet PC used by a teacher.

The receiver 2010 may receive a reference painting information request, including the identification information of the first image displayed on the first terminal 100, from the first terminal 100. Herein, the reference painting information request may include a request for the reference painting information of the second image related to the first image.

The identification information of the first image may include at least one of the identification information about the first image and the identification information of each object included in the first image.

For example, the receiver 2010 may receive the identification information of an object included in the first image from the first terminal as the identification information of the first image. The object may be selected based on a user input received by the first terminal 100.

The server 2000 may transmit the painting information of the extracted second image as the reference painting information about the first image to the first terminal 100.

According to an exemplary embodiment, the painting information of the second image may include a painted second image. According to another exemplary embodiment, the painting information of the second image may include painting information of an object included in a third image. The server 2000 may transmit painting information of a boundary region of the second image as the painting information of the second image to the first terminal 100. The boundary region of the second image may be a partial region of the second image that is located within a predetermined distance from a division line of the first image and the second image. Herein, the first image and the second image may be sub-images into which an image is divided.

The controller 2020 may extract the second image related to the first image, based on the received identification information of the first image.

The first image and the second image may be related images included in the same group. Herein, the related images may include a plurality of images (e.g., cartoon images) having temporal relations therebetween, or a plurality of sub-images into which an image is divided.

According to an exemplary embodiment, the controller 2020 may extract the second image from the painting information database stored therein, based on the identification information of the first image. For example, when the identification value of the group including the first image is x, the server 2000 may extract an image having an identification value "x" from the stored data.

The identification information of the first image may include identification information of at least one of the objects included in the first image. The controller 2020 may extract a third image including an object based on the received identification information of the object. Herein, when the second image includes the object, the third image may include the second image. For example, when receiving the identification value "y" of the object included in the first image, the controller 2020 may extract an object having identification information identical to the received identification information "y" of the object from the stored data.

According to another exemplary embodiment, the controller 2020 may request painting information of the second image from the second terminal displaying the second image related to the first image, based on the received identification information of the first image. Herein, the second terminal may include a terminal that has received related images from the server 2000 together with the first terminal 100.

For example, the server 2000 may transmit a painting information request message to the second terminal that displays the second image having an identification value identical to the received identification value "y" of the first image. Upon receiving the painting information request message, the second terminal may transmit the painting information of the second image to the server 2000.

The transmitter 2030 may transmit the painting information of the extracted second image as the reference painting information about the first image to the first terminal 100.

According to an exemplary embodiment, the painting information of the second image may include a painted second image. According to another exemplary embodiment, the painting information of the second image may include painting information of an object included in the second image. Also, the painting information of the second image may include painting information of a boundary region included in the second image.

The transmitter 2030 may transmit identification information about the second image to the first terminal 100 together with the painting information of the second image.

The apparatuses according to the exemplary embodiments may include a processor, a memory for storing and executing program data, a permanent storage such as a disk drive, a communication port for communicating with an external device, and user interface (UI) devices such as a touch panel, keys, and buttons. Methods implemented by a software module or algorithm may be stored on a computer-readable recording medium as computer-readable codes or program commands that are executable on the processor. Examples of the computer-readable recording medium include magnetic storage media (e.g., read-only memories (ROMs), random-access memories (RAMs), floppy disks, and hard disks) and optical recording media (e.g., compact disk-read only memories (CD-ROMs) and digital versatile disks (DVDs)). The computer-readable recording medium may also be distributed over network-coupled computer systems so that the computer-readable codes may be stored and executed in a distributed fashion. The computer-readable recording medium is readable by a computer, and may be stored in a memory and executed in a processor.

All references, including publications, patent applications, and patents, cited herein are hereby incorporated by reference to the same extent as if each reference is individually and specifically indicated to be incorporated by reference and is set forth in its entirety herein.

For the purposes of promoting an understanding of the exemplary embodiments, reference has been made to the exemplary embodiments illustrated in the drawings, and particular terms have been used to describe the exemplary embodiments. However, the scope of the exemplary embodiments is not limited by the particular terms, and the exemplary embodiments may encompass all elements that may be generally conceived by those of ordinary skill in the art.

The exemplary embodiments may be described in terms of functional block components and various processing operations. Such functional blocks may be implemented by any number of hardware and/or software components that execute particular functions. For example, the exemplary embodiments may employ various integrated circuit (IC) components, such as memory elements, processing elements, logic elements, and lookup tables, which may execute various functions under the control of one or more microprocessors or other control devices. Similarly, where the elements of the exemplary embodiments are implemented by software programming or software elements, the exemplary embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the exemplary embodiments may employ the related art for electronic environment setting, signal processing, and/or data processing. Terms such as "mechanism," "element," "unit," and "configuration" may be used in a broad sense, and are not limited to mechanical, hardware, and physical configurations. The terms may include the meaning of software routines in conjunction with processors or the like.

Particular implementations described herein are merely exemplary, and do not limit the scope of the exemplary embodiments in any way. For the sake of conciseness, descriptions of related art electronic configurations, control systems, software, and other functional aspects of the systems may be omitted. Also, the connection lines or connection members illustrated in the drawings represent exemplary functional connections and/or physical or logical connections between the various elements, and various alternative or additional functional connections, physical connections, or logical connections may be present in a practical apparatus. Also, no element may be essential to the practice of the exemplary embodiments unless the element is specifically described as "essential" or "critical".

The use of the terms "a," "an," and "the" and similar referents in the context of the specification (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the specification as if it were individually recited herein. Also, the operations of the method described herein may be performed in any suitable order unless otherwise indicated herein or otherwise clearly contradicted by the context. The scope of the exemplary embodiments is not limited to the above-described operation order. All examples or exemplary terms (e.g., "such as") provided herein are merely used to describe the exemplary embodiments in detail, and the scope of the exemplary embodiments is not limited by the examples or exemplary terms unless otherwise claimed. Also, those of ordinary skill in the art will readily understand that various modifications and combinations may be made according to design conditions and factors without departing from the spirit and scope of the exemplary embodiments as defined by the following claims.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A method for a terminal to provide painting information of an image, the method comprising:
    displaying a first image on a screen of the terminal;
    receiving a user input to select an object included in the first image, and to request for painting information of the selected object as reference information;
    in response to the user input:
        transmitting identification information of the selected object included in the first image to a server; and
        requesting the server for the painting information of the selected object that is shared with a second image of a second terminal and that is painted on a screen of the second terminal, the selected object having the same identification information in the second image of the second terminal;
    receiving the painting information of the selected object of the second image in the second terminal from the server; and
    performing a painting on the selected object of the first image in the terminal based on the received painting information of the selected object of the second image in the second terminal.

2. The method of claim 1, further comprising displaying the second image painted in at least one color on a predetermined region of the screen of the terminal.

3. The method of claim 1, further comprising displaying the painting information of the selected object of the second image for a predetermined period of time.

4. The method of claim 1, wherein the first image and the second image are different sub-images into which a single image is divided.

5. The method of claim 4, further comprising:
    selecting a partial region of the first image based on a user selection; and
    when the partial region is included in a first boundary region of the first image, which is located within a first predetermined distance from a division line between the first image and the second image, requesting the server for painting information of a second boundary region of the second image, which is located within a second predetermined distance from the division line.

6. The method of claim 5, further comprising displaying the painting information of the second boundary region of the second image, which is received from the server.

7. The method of claim 1, wherein the painting information of the selected object of the second image comprises at least one of color information, texture information, and thickness information of the selected object of the second image.

8. A method for a server to provide painting information of an image, the method comprising:
transmitting a first image to a first terminal and a second image to a second terminal; and
in response to selecting, by a user of the first terminal, an object included in the first image being displayed on the first terminal:
receiving, from the first terminal, identification information for the selected object included in the first image of the first terminal, and a request for painting information of the selected object that is shared with the second image of the second terminal and that is painted on a screen of the second terminal, the selected object having the same identification information in the second image of the second terminal; and
transmitting the painting information of the selected object in the second image to the first terminal,
wherein the painting information is displayed on the first terminal as reference information, and the first terminal performs a painting on the selected object of the first image based on the received painting information of the selected object of the second image in the second terminal.

9. The method of claim 8, further comprising:
requesting the painting information of the selected object of the second image to the second terminal displaying the second image.

10. The method of claim 8, wherein the transmitting of the painting information comprises transmitting a painted second image to the first terminal.

11. The method of claim 8, further comprising:
dividing a single image into a plurality of images comprising the first image and the second image.

12. The method of claim 11, further comprising;
receiving a request for painting information of a second boundary region of the second image, which is located within a predetermined distance from a division line between the first image and the second image.

13. The method of claim 12, wherein the transmitting of the painting information comprises transmitting the painting information of the second boundary region of the second image to the first terminal.

14. The method of claim 8, wherein the painting information of the selected object of the second image comprises at least one of color information, texture information, and thickness information of the selected object of the second image.

15. A terminal for providing painting information of an image, the terminal comprising:
a processor configured to display a first image on a screen of the terminal; and
a communication interface configured to receive a user input to select an object included in the first image, and to request for painting information of the selected object as reference information,
in response to the user input, the processor configured to:
transmit identification information of the selected object included in the first image to a server; and
request to the server for the painting information of the selected object that is shared with a second image of a second terminal and that is painted on a screen of the second terminal, the selected object having the same identification information in the second image of the second terminal, and
the processor further configured to:
receive the painting information of the selected object of the second image in the second terminal from the server; and
perform a painting on the selected object of the first image in the terminal based on the received painting information of the selected object of the second image in the second terminal.

16. A server which provides painting information of an image, the server comprising:
a processor configured to transmit a first image to a first terminal and a second image to a second terminal; and
a communication interface configured to, in response to selecting, by a user of the first terminal, an object included in the first image of the first terminal:
receive, from the first terminal, identification information for the selected object included in the first image, and a request for painting information of the selected object that is shared with a second image of a second terminal and that is painted on a screen of the second terminal, the selected object having the same identification information in the second image of the second terminal,
the processor further configured to transmit the painting information of the selected object in the second image to the first terminal,
wherein the painting information is displayed on the first terminal as reference information, and the first terminal performs a painting on the selected object of the first image based on the received painting information of the selected object of the second image in the second terminal.

17. A non-transitory computer readable storage medium storing one or more programs, the one or more programs comprising instructions that, when executed by a processor, cause a terminal to:
display a first image on a screen of the terminal;
receive a user input to select an object included in the first image, and to request for painting information of the selected object as reference information;
in response to the user input:
transmit identification information of the selected object included in the first image to a server; and
request to the server for the painting information of the selected object that is shared with a second image of a second terminal and that is painted on a screen of the second terminal, the selected object having the same identification information in the second image of the second terminal;
receive the painting information of the selected object of the second image in the second terminal from the server; and
perform a painting on the selected object of the first image in the terminal based on the received painting information of the selected object of the second image in the second terminal.

* * * * *